(12) United States Patent
Miller et al.

(10) Patent No.: US 10,895,537 B2
(45) Date of Patent: Jan. 19, 2021

(54) LASER INTENSITY CALIBRATION

(71) Applicant: PerkinElmer Health Sciences, Inc., Waltham, MA (US)

(72) Inventors: Erik Miller, Belchertown, MA (US); Zhiyong Peng, Wellesley, MA (US); James White, Maynard, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 0 days.

(21) Appl. No.: 16/382,028

(22) Filed: Apr. 11, 2019

(65) Prior Publication Data

US 2020/0326284 A1 Oct. 15, 2020

(51) Int. Cl.
*G01N 21/64* (2006.01)
*G06K 9/00* (2006.01)

(52) U.S. Cl.
CPC ..... *G01N 21/6458* (2013.01); *G01N 21/6486* (2013.01); *G01N 2201/127* (2013.01); *G06K 9/00127* (2013.01)

(58) Field of Classification Search
CPC .......... G01N 21/6458; G01N 21/6486; G06K 9/00127
See application file for complete search history.

(56) References Cited

U.S. PATENT DOCUMENTS

| | | | | |
|---|---|---|---|---|
| 2010/0035349 | A1* | 2/2010 | Bau ............ | G01N 35/0092 436/43 |
| 2010/0267049 | A1* | 10/2010 | Rutter ............ | G01N 21/77 435/7.1 |
| 2012/0152746 | A1* | 6/2012 | Santiago ............ | G01N 27/44726 204/549 |
| 2012/0202278 | A1* | 8/2012 | Wagner ............ | G01N 15/1459 435/288.7 |
| 2014/0248632 | A1* | 9/2014 | Kopelman ............ | G01N 33/587 435/7.1 |

(Continued)

FOREIGN PATENT DOCUMENTS

| WO | 2017130143 A1 | 8/2017 |
|---|---|---|
| WO | 2019002281 A1 | 1/2019 |

OTHER PUBLICATIONS

Nena M. Marin et al., "Calibration Standards for Multicenter Clinical Trials of Fluorescence Spectroscopy for In Vivo Diagnosis," Journal of Biomedical Optics, vol. 11, No. 1, Jan. 1, 2006, pp. 014010-014011, XP05570842,0, ISSN: 1083-3668, DOI: 10.1117/1.2166389.

(Continued)

*Primary Examiner* — Blake C Riddick
(74) *Attorney, Agent, or Firm* — Banner & Witcoff, Ltd.

(57) ABSTRACT

Systems, apparatuses, and methods are described for calibrating a laser power are described. A system may include a sample to be tested and a control sample that comprises a control analyte. A user may indicate a known concentration of the control analyte to the system (e.g., by entering a concentration value into a user interface or other process). The system may perform multiple runs at different laser powers and compare the measurements of each run against expected values for the control analyte at the known concentration. From that comparison, a calibrated laser power may be computed and that computed power level can be used by the system for the running of tests on an unknown sample.

19 Claims, 23 Drawing Sheets

(56) References Cited

U.S. PATENT DOCUMENTS

| | | | |
|---|---|---|---|
| 2015/0276588 A1* | 10/2015 | Marshall | G01N 21/1717 |
| | | | 250/343 |
| 2015/0276589 A1* | 10/2015 | Wagner | G01N 15/0205 |
| | | | 356/440 |
| 2017/0030823 A1* | 2/2017 | Wagner | G01N 21/05 |
| 2018/0024041 A1* | 1/2018 | Wagner | G01N 15/1404 |
| | | | 250/339.06 |
| 2018/0045648 A1 | 2/2018 | Abate et al. | |
| 2018/0335390 A1* | 11/2018 | Leung | G01N 21/78 |
| 2019/0032114 A1* | 1/2019 | Trivedi | B01L 3/5027 |
| 2019/0113436 A1* | 4/2019 | Wagner | G01N 21/3577 |
| 2020/0080940 A1* | 3/2020 | Garsha | G01N 21/6428 |

OTHER PUBLICATIONS

Jul. 8, 2020—(WO) International Search Report and Written Opinion—App. No. PCT/US2020/026597 [dated Aug. 25, 2020].

\* cited by examiner

|    | Power 1 | Power 2 | Power 3 | Power 4 |
|----|---------|---------|---------|---------|
| 1A | 1       | 2       | 3       | 4       |
| 1B | 5       | 6       | 7       | 8       |
| 1C | 9       | 10      | 11      | 12      |
| ...|         |         |         |         |

Figure 7A

|    | Power 1 | Power 2 | Power 3 | Power 4 |
|----|---------|---------|---------|---------|
| 1A | 1       | 9       | 17      | 25      |
| 1B | 2       | 10      | 18      | 26      |
| 1C | 3       | 11      | 19      | 27      |
| ...|         |         |         |         |

Figure 7B

LASER INTENSITY CALIBRATION

TECHNOLOGICAL FIELD

Various aspects of the disclosure relate to calibrating the intensity of a laser performing one or more assays.

BACKGROUND

Electrophoresis is one technique used to measure the presence and/or concentration of a substance. Based on different migration rates for various ions, ions may be separated from each other when subjected to an electric field. Electrophoresis is used to identify concentrations of macromolecules, such as proteins, in a sample. Each run may produce slightly different results based on a number of factors including pipetting and dilution techniques, skill of the technician in preparing samples, dilution factors, numbers of runs, positioning of a well in a test system, and laser intensity, among other factors. To account for these factors, multiple runs of a sample are conducted using a set of wells with samples. The coefficient of variation (CV) is used as quality control in quantitative tests. Determining an overall CV may be complex based on combining intra-assay CVs with inter-assay CVs. Calibration of systems used to perform tests may require significant portions of time prior to the testing of samples.

SUMMARY

The following summary presents a simplified summary of certain features. The summary is not an extensive overview and is not intended to identify key or critical elements.

Systems, apparatuses, and methods are described for calibrating one or more lasers in an electrophoretic separation system. The electrophoretic separation system may be used to separate macromolecules of sample including, but not limited to, proteins, nucleic acids, and/or other charged molecules and monitor their fluorescence when passing through a testing channel. The calibration may include performing multiple runs of a known or control sample at different laser powers that can be preselected. Based on the measured data from the multiple runs using different laser powers applied to the control sample containing a control analyte, an analysis can be performed to compare the measured data from the system under test (e.g., the test system comprising the laser to be calibrated) to empirically determined data. Because the concentration of the control analyte in the control sample is known, at least one characteristic of the control analyte, e.g., the peak area, peak width, and/or peak height, etc., can be empirically determined, and a computed or calibrated laser power for the test system may be obtained by comparing the empirically determined characteristic for the control analyte, to characteristics of the control analyte that are based on measurements of the control analyte made by the test system.

The disclosed methods and systems include a system comprising a laser, microfluidic channel, sensor, a memory; and, a processor configured to execute instructions stored in the memory, the instructions causing the processor to: store a known concentration of a control analyte, the control analyte being present in a control sample at the known concentration; determine an empirically determined at least one characteristic of the control analyte using the known concentration of the control analyte and an empirically determined model, perform multiple tests of the control sample at different laser powers applied to the microfluidic channel, obtain measurements from the sensor while performing the multiple tests, determine the at least one characteristic of the control analyte from the sensor measurements, compute a calibrated laser power based on comparing the at least one characteristic of the control analyte from the sensor measurements and the at least one empirically determined at least one characteristic; and, perform, at the calibrated laser power, at least one test of a sample to be tested. In an embodiment, the sensor measurements are intensities of light generated by at least one of fluorescent dyes or fluorescent tags associated with components of the control sample in the microfluidic channel, and the sensor measurements may correspond to a fluorescence related to the control analyte having the known concentration. The instructions may further cause the processor to store the sensor measurements.

In embodiments, the instructions to determine an empirically determined at least one characteristic of the control analyte comprise instructions to determine at least one of a peak area, peak height, or peak width based on the known concentration of the control analyte. In one aspect, the instructions to determine an empirically determined at least one characteristic for the control analyte comprise instructions to empirically determine a peak area based on the known concentration of the control analyte and the empirical model, wherein the instructions to determine the at least one characteristic of the control analyte from the sensor measurements include instructions to compute at least one peak area based on the sensor measurements of the control analyte, and, wherein the instructions to compute a calibrated laser power include instructions to compare the empirically determined peak area with the at least one peak area determined from the sensor measurements of the control analyte, and based on the comparison, compute the calibrated laser power.

In an embodiment, the instructions to determine an empirically determined peak area include instructions to express the peak area of the control analyte based on a linear relationship with the concentration of the control analyte, using the form $y=mx+b$, where x is the known concentration of the control analyte, m is an empirically determined slope of the line, b is the empirically determined y-intercept of the line, and y is the empirically determined peak area. In some embodiments, the instructions to compute a calibrated laser power based on comparing the empirically determined peak area with the at least one peak area determined from the sensor measurements of the control analyte, include instructions to determine a quadratic polynomial of the form $y=az^2+bz+c$ to represent the relationship between the different laser powers and the measured peak areas for the control analyte, where, while performing the steps of determining the polynomial, y is the peak area of the control analyte (as determined from the sensor measurements), z is the different laser powers used to perform the multiple tests, and a, b, and c are fitting parameters that are adjusted to fit the polynomial to the data based on measuring the control analyte data during the multiple tests, and, wherein the instructions to compute a calibrated laser power include instructions to compute, using the determined quadratic polynomial, a calibrated laser power, z, that corresponds to the empirically determined peak area, y, for the control analyte.

In an embodiment, the instructions to determine a quadratic polynomial include instructions to determine the fitting parameters a, b, and c using at least one estimation technique, including a regression technique.

Also disclosed are methods and systems that include an empirical model for a control analyte, the empirical model representing a relationship between a first characteristic of a control analyte and at least one second characteristic of the control analyte, performing multiple tests of a control sample at different laser powers, wherein the control sample comprises the control analyte with a known concentration, obtaining measurements from a sensor while performing the multiple tests, computing at least one characteristic of the control analyte based on the measurements, determining, based on the known concentration of the control analyte and the empirical model, at least one empirically determined characteristic of the control analyte, comparing the computed at least one characteristic based on the measurements with the empirically determined at least one characteristic, to provide a computed laser power; and, performing, at the computed laser power, multiple tests of a sample to be tested. In an embodiment, the sensor measurements are intensities of light from fluorescence of based on the concentration of at least the control analyte.

In some embodiments, the empirical model is a relationship between control analyte concentration and peak area corresponding to the electrophoretic separation of the control analyte in an electrophoretic separation test, although the disclosed methods and systems are not so limited. In such embodiments, the first characteristic of the control analyte is concentration and the second characteristic of the control analyte is peak area for the control analyte in an electrophoretic separation. For example, in some instances, the empirical model is a linear model, and the linear model is based on running tests of the control analyte while independently varying individual test parameters comprising at least one of concentration and laser power.

For the disclosed methods and system, comparing the computed at least one characteristic of the control analyte based on the measurements with the empirically determined at least one characteristic of the control analyte, includes processing the sensor measurements of the control analyte in accordance with the at least one characteristic of the control analyte that is associated with the empirical model, i.e., so that the characteristic of the control analyte derived or determined from the sensor measurements, can be utilized with the empirical model. In certain embodiments, the at least one characteristic of the control analyte comprises at least one of peak area, peak height, and peak width.

In some embodiments of the disclosed methods and systems, providing an empirical model for a control analyte includes providing a model for empirically determining a peak area, y, based on the known concentration, x, of the control analyte, using the linear relationship y=mx+b, where m is the slope of a line, and b is the y-intercept of the line, where m and b are based on empirical data, and where determining, based on the known concentration of the control analyte and the empirical model, at least one empirically determined characteristic of the control analyte comprises determining, using the linear relationship, an empirically determined peak area, y, based on the known concentration of the control analyte in the control sample, and, wherein comparing the computed at least one characteristic of the control analyte based on the measurements with the empirically determined at least one characteristic, to provide a computed laser power, comprises determining a quadratic polynomial of the form $y=az^2+bz+c$ to represent the relationship between the different laser powers and the peak areas associated with the sensor measurements for the control analyte at the different laser powers, where, in determining the quadratic polynomial, y is the peak area of the control analyte as computed from the sensor measurements, z is laser power used during the tests, and a, b, and c are fitting parameters that are adjusted to fit the polynomial to the peak areas determined from the measurements of the control analyte data, and also, computing using the determined quadratic polynomial, a calibrated laser power, z, that corresponds to the empirically determined peak area, y, for the known concentration of the control analyte.

In an embodiment, providing an empirical model comprises collecting empirical data using a known test system while varying test parameters associated with the first characteristic and the second characteristic of the control analyte. Providing an empirical model may further comprise determining a relationship between a concentration of the control analyte, and a peak area corresponding to an electrophoretic separation of the control analyte. In some embodiments, providing an empirical model comprises determining a linear relationship between a concentration of the control analyte, and a peak area corresponding to an electrophoretic separation of the control analyte.

These and other features and advantages are described in greater detail below.

BRIEF DESCRIPTION OF THE SEVERAL VIEWS OF THE DRAWINGS

Some features are shown by way of example, and not by limitation, in the accompanying drawings. In the drawings, like numerals reference similar elements. The drawings include:

FIGS. 7A and 7B show examples of laser powers for testing of samples;

DETAILED DESCRIPTION

Figure 1A:
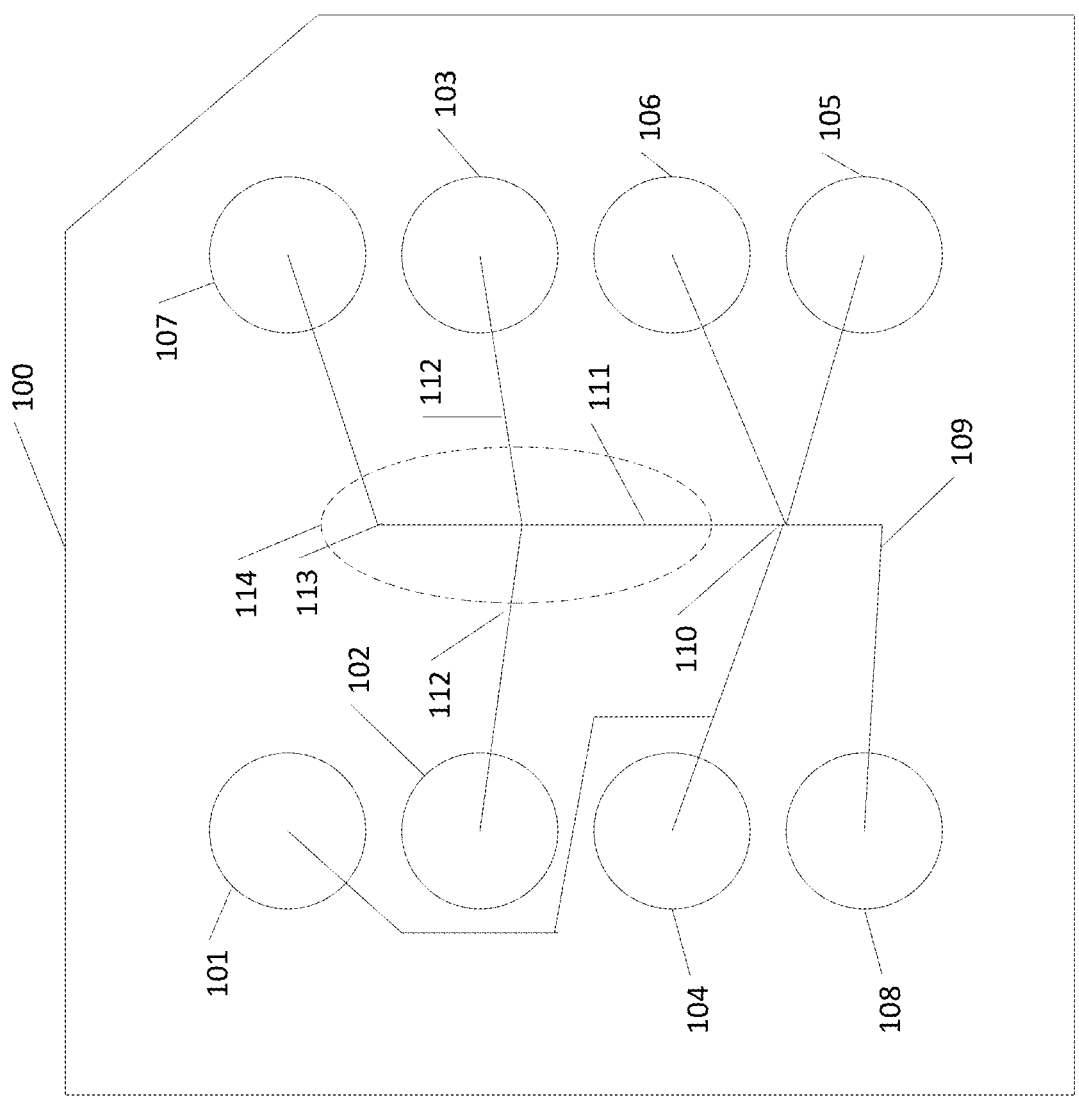
FIG. 1A shows an example of a microfluidic chip tray with various channels.

The accompanying drawings, which form a part hereof, show examples of the disclosure. It is to be understood that the examples shown in the drawings and/or discussed herein are non-exclusive and that there are other examples of how the disclosure may be practiced.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or the optical spectrometer comprising the component.

Measurement of an analyte (such as a macromolecule) size, concentration, and purity help ensure the efficacy and safety of macromolecule products for biopharmaceutical and other industries. One technique used for measurements of macromolecules (including but not limited to proteins, nucleic acids, or other macromolecules) is microfluidic electrophoretic separation, the results of which can be represented by a plot of time versus intensity, with each macromolecule in a sample being associated with a "peak" on the plot, where the time of a given peak corresponds to the travel time or size/identity of a given macromolecule in the sample, and the height, size, or intensity (e.g., fluorescence measurement) of the peak can be related to a concentration of that same macromolecule. Those of ordinary skill will understand that certain characteristics of the "peaks" associated with such a time v. intensity are routinely computed in the art, such as, for example, determining height or area associated with a particular peak; however, the methods and systems disclosed herein are not limited to such techniques which are performed in various ways by those or ordinary skill. Accordingly, for explanatory purposes, proteins are used herein as an example of the analyte/macromolecules being tested, and similarly, the characteristic of the peak resulting from microfluidic electrophoretic separation that is used herein is the "peak area." It is appreciated that other analytes or macromolecules may be tested in place of or addition to the testing of proteins, and that other characteristics of a peak may be used other than and/or in addition to peak area, e.g., peak height, peak width, etc.

To express the precision, or repeatability, of test results, two measures of the Coefficient of Variability (CV) in test results are assessed: the Inter-Assay CV and the Intra-Assay CV. The CV is a dimensionless number defined as the standard deviation of a set of measurements divided by the mean of the set. For the testing of a sample, multiple runs may be performed using a single plate or tray, with the plate or tray having multiple wells, with a portion of the sample to be tested in a number of the wells. The intra-assay CV is an expression of the well-to-well consistency. The inter-assay CV is an expression of the plate-to-plate consistency.

Running tests on multiple samples on a single plate can help account for variances in setup techniques (including pipetting techniques) of a single technician (providing a single technician prepared the samples on the plate). Running tests using multiple machines using the same or different plates prepared by the same or different technicians can help account for variances in the different machines, how the same plate or different plate is placed in each machine, and different setup skills of the technicians.

One technique used to analyze samples is electrophoresis in which a sample is subjected to an electric field. In some electrophoretic techniques, the sample is placed at one end of a channel containing a gel and an electric field applied to the gel. Based on a number of factors including, but not limited to, the electric field applied to the channel, the density of the gel, the molecular weight of a macromolecule in the sample, one or more macromolecules in the sample moves down the channel. To optically detect the time for a given macromolecule to move down the channel, or alternatively, pass a particular observation location, the macromolecules may be modified with one or more dyes or tags, including one or more fluorescent dyes or tags. For example, the one or more dyes or tags may be chosen to fluoresce when subjected to or interrogated by one or more selected wavelengths of light. In such embodiments, at a particular location(s) in a microfluidic channel, the channel may be illuminated by a light source (for example, a laser or other light source) emitting the one or more wavelengths at which the one or more dyes or tags fluoresce. The type and quantity of a given analyte or macromolecule may be thus determined based on (i) the time at which the dye or tag bound to the macromolecule passes (i.e., is detected at, e.g., by optical sensors) an observation area during a sample test run; and/or, (ii) the intensity of the detected fluorescence.

Some variances in measurements of the type and quantity of a macromolecule may be reduced by using the same brand, concentrations, and lot numbers of markers, gel-dye, and destaining solutions. However, some variances in measurements may also be due to the skill of the technicians, the machines used for testing, and the placement of trays in the machines. Despite taking precautions by trained technicians and using common testing materials, the intra-CV and inter-CV values may be difficult to reduce.

Systems, apparatuses, and methods are described herein that may help reduce one or both of the CV values by calibrating light intensity for given sample run or set of sample runs. In various examples, the light intensity may be related to the power applied to the light. For the purposes of explanation, one or more lasers are described as the light source. Additionally or alternatively, other light sources may be used including fluorescent lamps, gas discharge lamps, plasma-based light sources, UV LEDs, and the like. It is appreciated that the techniques described herein may be applied to any of the various light sources to calibrate the intensity level of the light source for sample analysis purposes.

FIG. 1A shows an example of a microfluidic chip tray 100 with various wells, such as the PerkinElmer LabChip® product. The wells may include a waste well 101, wells 102 and 103 containing destain, wells 104, 105, 106, and 107 containing gel-dye, and well 108 containing a marker. The wells may be connected by one or more capillaries that connect various wells. For example, a sipper capillary 109 may introduce a sample into an injection intersection 110 and be mixed with the gel-dye from one or more of wells 104, 105, and 106. Based on an applied electric field, the macromolecules in the sample travel along a separation channel 111. The macromolecules may be destained from wells 102 and 103 via capillaries 112. The macromolecules may be detected at location 113. The number, placement, connection of the wells via capillaries, injection point or points, and detection point or points may be varied as desired. An electrophoretic microchip is shown generally with dashed lines 114. The microchip may include more capillaries or fewer capillaries than shown in FIG. 1A as needed.

Figure 1B:
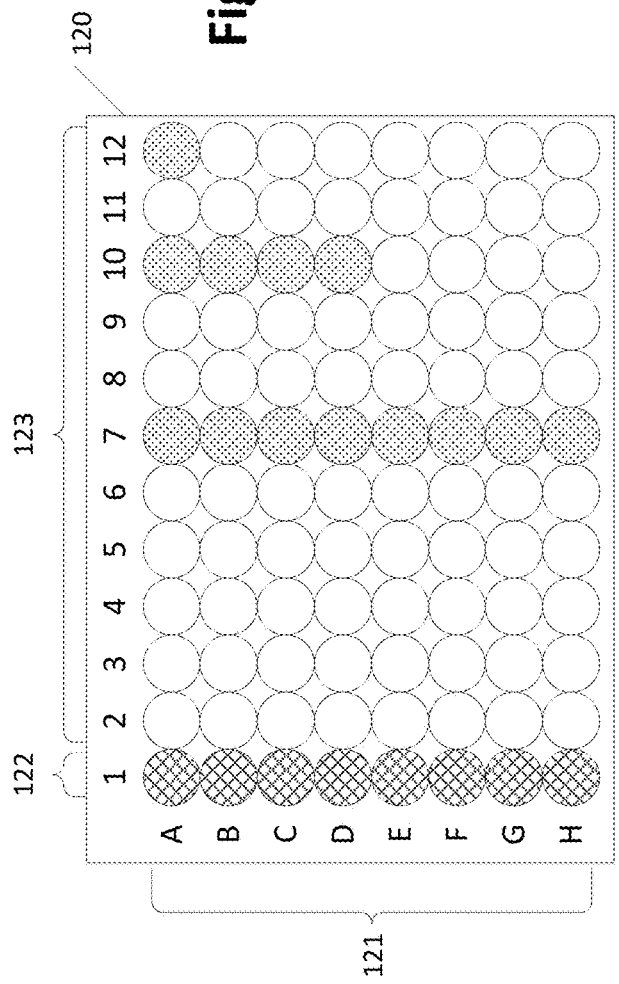
FIG. 1B shows a sample plate with various wells.

FIG. 1B shows a sample plate 120 with various wells 121. Sample plate 120 may also be referred to as a microplate, a microtiter plate, a microwell plate, or a multiwell plate. Wells 122 represent a column of a sample to be tested (shown crosshatched). Wells 123 do not contain the sample (shown without shading or crosshatching). One or more wells may contain a control sample. For example, well A12 may be the only well containing the control sample (shown shaded). Alternatively or additionally, a full column of wells (e.g., column 7 with shaded wells) may be used to contain the control sample(s). Alternatively or additionally, two or more wells but less than a complete column of wells (e.g., four wells in column 10—shown shaded) may be used to contain the control sample. Other arrangements of which wells contain and do not contain a sample are possible and may vary based on the quantity of sample available, time available for testing, and the precision of the desired results. Further, the sample to be tested may be located wells other than in the column of wells 122.

Figure 1C:
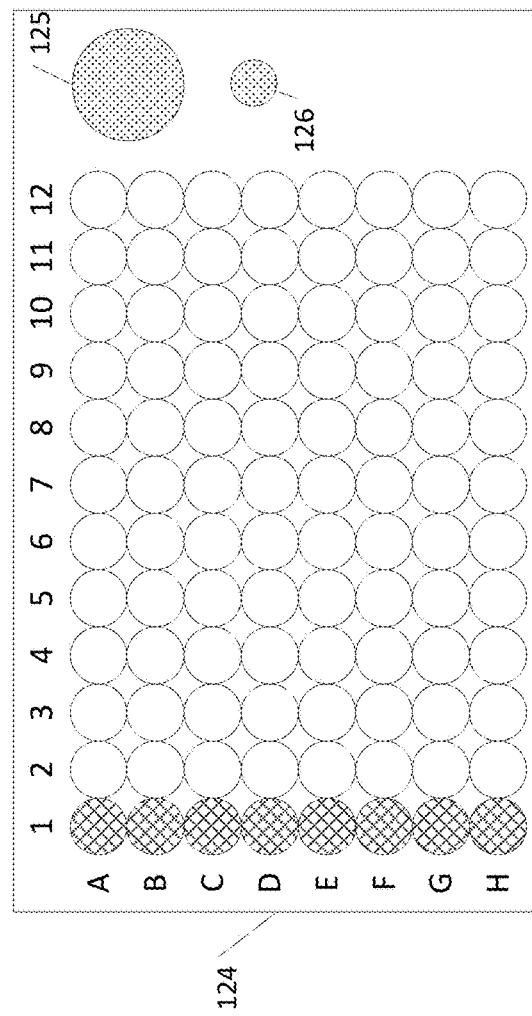
FIG. 1C shows another sample plate with wells.

FIG. 1C shows another sample plate 124 with wells. Column 1 is a column of a sample to be tested. The control sample is located in one or more wells not part of the regular set of wells. For example, the control sample may be placed in one or both of wells 125 and/or 126. The size of the well or wells containing the control sample may be the same or different from other wells in the sample plate 124. For example, well 125 is larger than other wells. Also, well 126 is smaller than the other wells. Other arrangements, different from those shown in FIGS. 1B and 1C, of which wells contain and do not contain a sample are possible and may vary based on the quantity of sample available, time available for testing, and the precision of the desired results.

Figure 2:
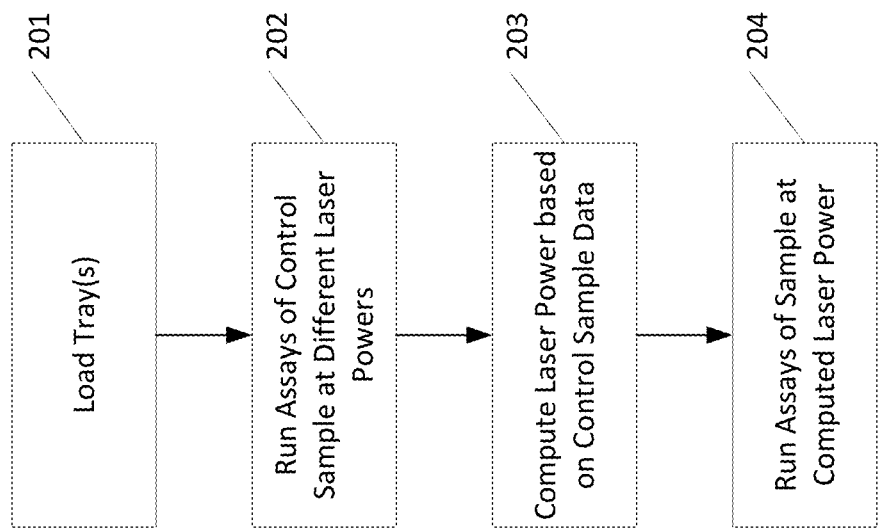
FIG. 2 is a flow chart showing an example method for testing a sample.

FIG. 2 is a flow chart showing an example method for testing a sample in accordance with the disclosed methods and systems. In step 201, one or more sample plates containing a control sample, a sample to be tested ("test sample"), and various ingredients for the tests (including for instance, gel-dye, destain solution) are loaded into a test system. A known or concentration of a control analyte (e.g., macromolecule, e.g., protein) within the control sample may be identified to the system, for instance, by a technician, and from that concentration, fluorescence data can be empirically determined for that analyte ("control analyte"). In step 202, multiple test runs of the control sample are performed, where the laser power may be different for different runs. Additionally or alternatively, some runs may be performed by repeating a laser power. In step 203, a laser power is computed based on a comparison of the measured data from the test runs on the control sample, and specifically, the control analyte, to empirically determined data for the control analyte. In one embodiment, the results from the multiple tests of the control sample (and more specifically, the control analyte) are used to perform a regression analysis. In some of these embodiments, the regression analysis may be based on one or more of laser power (e.g., mW), observed migration time(s), observed relative fluorescence (RFU), and measured peak area(s) for the control analyte (e.g., raw data, filtered measurements, signal processed measurements, etc.). The output of step 203 is a computed (calibrated) laser power that has been determined to provide a peak fluorescence and/or peak area corresponding to an empirically determined peak area, for the control analyte/macromolecule of interest. In step 204, using the computed laser power, tests are performed or run for the set of samples to be tested ("test samples").

It can be understood to one of ordinary skill that the disclosed methods and systems rely on an empirical relationship between analyte concentration and peak target area, for a given control analyte. For example, to determine such empirical relationship, many "empirical" test runs of an analyte or macromolecule of interest on a known (e.g., calibrated) test system (e.g., utilizing electrophoretic separation) may be run by varying one parameter at a time, with such parameters including at least one of concentration (of the control analyte/macromolecule), laser power, etc. It can be understood that the variation of test parameters while collecting empirical data can vary based on the empirical model that is being determined, as the empirical data must be collected to allow for the derivation of an appropriate relationship between a first characteristic of the control analyte and a second characteristic of the control analyte. As such, from the empirically collected or obtained data, a relationship (e.g., model(s)) can be determined between the first characteristic or property of the control analyte that is associated with the control analyte, and the second control analyte characteristic or property. For example, in a system such as the illustrated embodiments that employ electrophoretic separation, electrophoretic separation characteristics of the control analyte's electrophoretic profile such as peak area, peak width, and/or peak height, etc., can be related to control analyte characteristics or properties such as e.g., analyte concentration, laser power, etc., for the given control analyte. As such, a property or characteristic of a control analyte can be based on the control analyte or processing of data associated with the control analyte. In embodiments, the empirical model can be represented as a linear relationship, although in other embodiments, the relationship may be represented by a quadratic or another form. In the instant example embodiment where the relationship is represented as a linear model (e.g., the data from the empirical test runs can be used to determine a line) between peak area (electrophoretic separation of control analyte) and associated concentration of the control analyte, the relationship can be represented by the equation $y=mx+b$, where, e.g., "x" is the control analyte's concentration, "y" is the peak area for the control analyte, "m" is the slope of the line, and "b" is the y-intercept of the line, with all such determinations being made from the empirical data. With this empirical relationship or model, for any given known/control concentration, x, of the control analyte, an empirically determined peak area, y, for that control analyte can be determined. Those of ordinary skill will understand that the aforementioned empirical relationship or model is based on a specified control analyte, and thus, empirical data and a relationship between concentration and peak area (or such other characteristic of the control analyte that can be measured by a system under test) needs to be determined for each specific or different control analyte.

Figure 3:
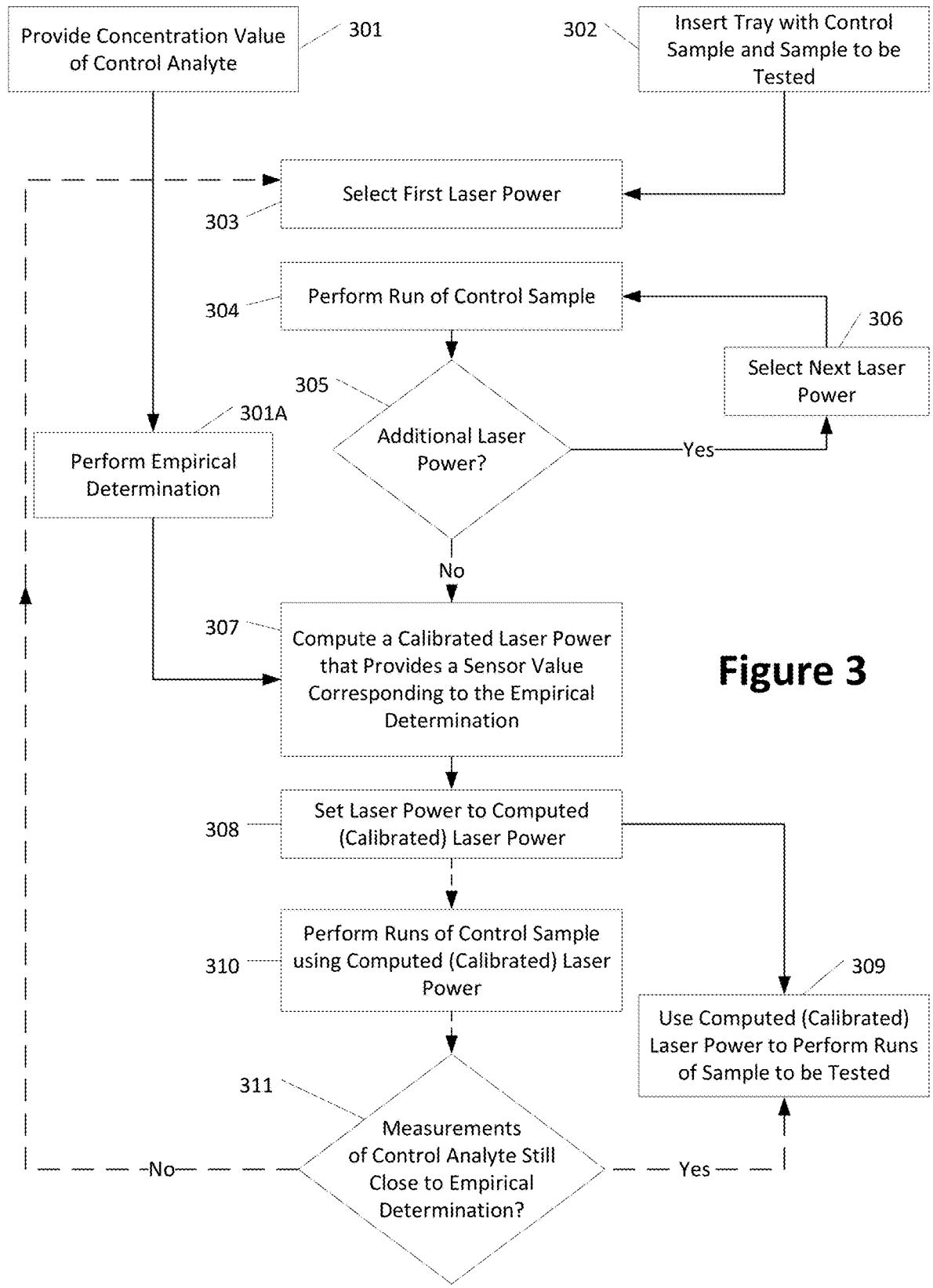
FIG. 3 is a flow chart showing an example method for calibrating laser power and testing a sample.

FIG. 3 is a flow chart showing an example method for calibrating laser power and testing at least one sample on a given test system, once an empirical relationship/model between a control analyte and a measurement parameter has been developed and/or determined, as provided herein. In step 301, a known concentration of a control analyte is contained in a control sample, which may include other components such as, e.g., other proteins. For this FIG. 3 embodiment, the control analyte can be understood to be a protein of interest, or "control protein," and it can be understood that the control sample contains a known concentration of the control protein/analyte. The control sample may also contain other analytes, e.g., other proteins and/or macromolecules. At 301, the known concentration of the control protein is entered into or provided to the test systems and/or methods, and at 301A for the example system where peak area is the characteristic of the control analyte/protein to be measured by the system under test, an empirically determined peak area may be computed based on an empirically determined model/relationship between concentration and peak area, for the control analyte/protein. In many embodiments, such a model or relationship has been predetermined and/or exists prior to the entry of the known concentration by a user. For example, the concentration value of the control analyte may be entered by a technician into a user interface of the test system. Additionally or alternatively, the concentration of the control analyte may be identified to the test system and/or method through another data entry process. For example, a technician may be prompted to scan a barcode affixed to a bottle of the control sample to obtain the concentration of the control analyte directly from the barcode or indirectly (e.g., using an internal lookup table associating barcodes with test sample concentration values).

In step 302, a plate containing the control sample and at least one test sample is inserted into the test system. Additionally or alternatively, the control sample and the test sample may be provided separately, e.g., in separate plates.

In step 303, a processor (e.g., associated with the test system and/or the microchip in a microfluidic chip tray 100) selects a first laser power to be applied by a light source (e.g., laser) to the microfluidic channel. In step 304, the processor runs one or more tests on the control sample at the first laser power, in each case, storing the collected and corresponding data/measurements, including for example, power (e.g., of the laser or other light source), measured peak areas, and time of peaks. In step 305, the processor determines whether additional laser powers are to be used on the control sample. If additional laser powers are to be applied to the control sample, then the next laser power is selected in step 306 and the control sample is tested in step 304 using the newly selected laser power. Once no additional laser powers are to be applied to the control sample (containing the control analyte), the processor computes a calibrated laser power 307 based on a comparison of the measured data and the empirically determined data from 301A.

At 307, in one embodiment, based on the data collected in steps 303-305 of FIG. 3, for the given test system, a relationship between power (e.g., laser power) and peak area may be determined for the control analyte, where again, in the example embodiment, peak area corresponds to the peak area associated with the control analyte in an electrophoretic separation. For example, measurements from the various laser powers can be analyzed specifically with respect to the control protein/analyte to provide a composite measurement (e.g., average, filtered, minimum, maximum) of peak area for the control protein at a given power.

Figure 4:
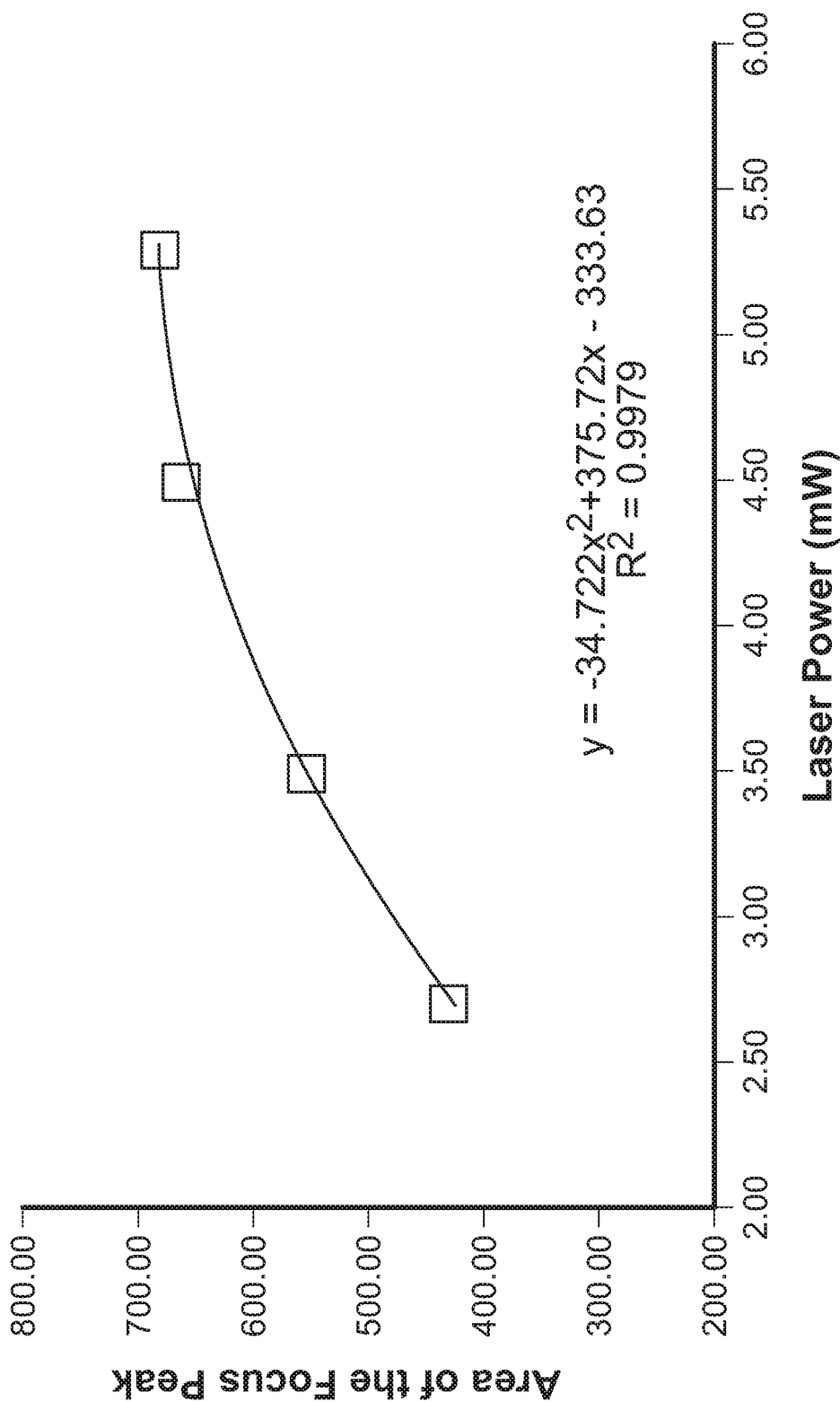
FIG. 4 shows a graph of a line fitted through sample values and used to determine a laser power.

FIG. 4 depicts one such embodiment of a system comprising a laser, where four predetermined (4) laser powers (or power levels), e.g., approximately 2.7 mW, 3.5 mW, 4.5 mW, and 5.3 mW, were used to measure the control sample (and hence the control analyte) as provided in 303-305 of FIG. 3. FIG. 4 depicts four (4) points, one at each of the four (4) laser powers, indicating a peak area (e.g., a composite peak area for all of the test runs at a given laser power, e.g., an average, a median, a maximum, a minimum) of the control analyte/protein as measured at the respective laser powers. From the four (4) data points, as shown in FIG. 4, a relationship can be determined between laser power and peak area for the given test system, and the control analyte/protein. Although such relationship can be represented by a linear, quadratic, or another relationship, in the example embodiment, the relationship is represented by a quadratic and thus can be represented by the equation $y=az^2+bz+c$, where "z" is laser power used to determine the data in FIG. 4 (e.g., the laser powers used during the measurements), "y" is peak area as determined from the various test runs at the different laser powers, and "a", "b", and "c" are fitting parameters, which can be determined using a regression or another estimation technique. Once the fitting parameters, a, b, and c are determined, the empirically determined peak area, 301A, for the control analyte, can be used as "y" in the quadratic equation, thereby leaving a single variable "z", or computed or calibrated laser power, to be determined. Solving or computing the quadratic equation for z, or the calibrated laser power, provides a computed or calibrated laser power for which test samples can then be run.

Those of ordinary skill will understand that the aforementioned technique is merely of various techniques that may be used to determine the computed or calibrated laser power including, and other example methods include but are not limited to: for each set of optical/fluorescence sensor output values, find a difference between the empirically determined peak sensor for the known concentration of step 301A and the measured peak sensor values for the control protein/analyte for one or more selected laser powers (steps 303, 306) (e.g., averaging, median, etc.), and determine the computed or calibrated laser power based on the smallest difference; or, for each set of optical/fluorescence sensor values measured, find a difference between the empirically determined peak area (301A) for the control protein/analyte and the measured peak area of the control protein/analyte using the one or more selected laser powers (steps 303, 306), and compute the calibrated laser power based on the smallest difference; and/or, find a difference between the empirically determined peak area for the control protein/analyte, and the measured peak area of the control protein/analyte at the selected laser powers (steps 303, 306), where the measured peak areas are compared using a weighted combination (e.g., 1:1, 2:1, 1.5:2, and the like), and indicate the laser power associated with the smallest difference. In some embodiments, an optical/fluorescence sensor value measured above and/or an optical/fluorescence sensor value measured below and an empirically determined fluorescence of the control protein/analyte may be obtained at different selected laser powers, and, based on a ratio of the empirically determined fluorescence compared to the two fluorescence measurements, a computed calibrated laser power may be determined as between the laser powers associated with the measured fluorescence above and/or below, the empirically determined fluorescence, and relative to the measured ratio.

In step 308, the processor sets the laser power to the computed (calibrated) laser power that was computed in step 307. In step 309, the processor controls the test system to use the calibrated laser power in performing subsequent tests on test samples. In step 309, runs of one or more sets of wells may be performed on the sample to be tested.

In an embodiment, the sensor for measuring fluorescence may be a CCD (charge coupled device), a CMOS sensor array, a photodiode, and/or other optical sensor.

Step 309 may be performed directly after step 308 or after a period of time and/or repeatedly at specific and/or random intervals, to (re)confirm the computation and/or selection of the calibrated laser power. For example, after the selection of the calibrated laser power in step 308, the processor may perform (in step 310) one or more runs using the calibrated laser power on the control sample to measure the control analyte. In step 311, the processor may determine whether the measured sensor values and/or data derived therefrom (e.g., time and fluorescence, or data derived therefrom, e.g., peak, area, or combination of peak and area) for the control analyte continue to approximate, to within a desired or specified tolerance, the empirically determined value(s) of the characteristic of the control analyte (e.g., peak area) determined in step 301A. If the sensor values using the calibrated laser power remain within the specified or desired tolerance (e.g., less than 5%, less than 2%, less than a value smaller than 1%) remain within the tolerance, then the calibrated laser power may continue 311 to be used in step 309 to perform the additional tests on samples. If, alternatively, the sensor values determined in step 310 equate to measurements that are outside of a desired or specified tolerance when compared to the empirically determined value(s) for the characteristic of the control analyte 311, then the processor can be instructed to re-perform the power calibration steps again starting, for example, at step 303. In such an embodiment, for example, a polynomial curve with new fitting parameters will need to be determined, and hence a new computed or calibrated laser power based on the same empirically determined characteristic of the control analyte (301A).

A test system used to perform the experiments may include one or more lasers configured to illuminate a channel. The channel may be part of the testing system itself or may be provided separately. For example, the channel may be part of a capillary electrophoresis microchip. The microchip may have one or more integrated processors that control or assist with the control of electrophoresis testing of a sample. The channel may be subjected to an electric field created between two or more electrodes charged to different potentials. The computer-controlled operations described herein may be implemented in computer-readable instructions stored in memory associated with the electrophoresis microchip, in memory associated with or in a combination of both. The testing system may be controlled by a computing device described in FIG. 5.

Figure 5:
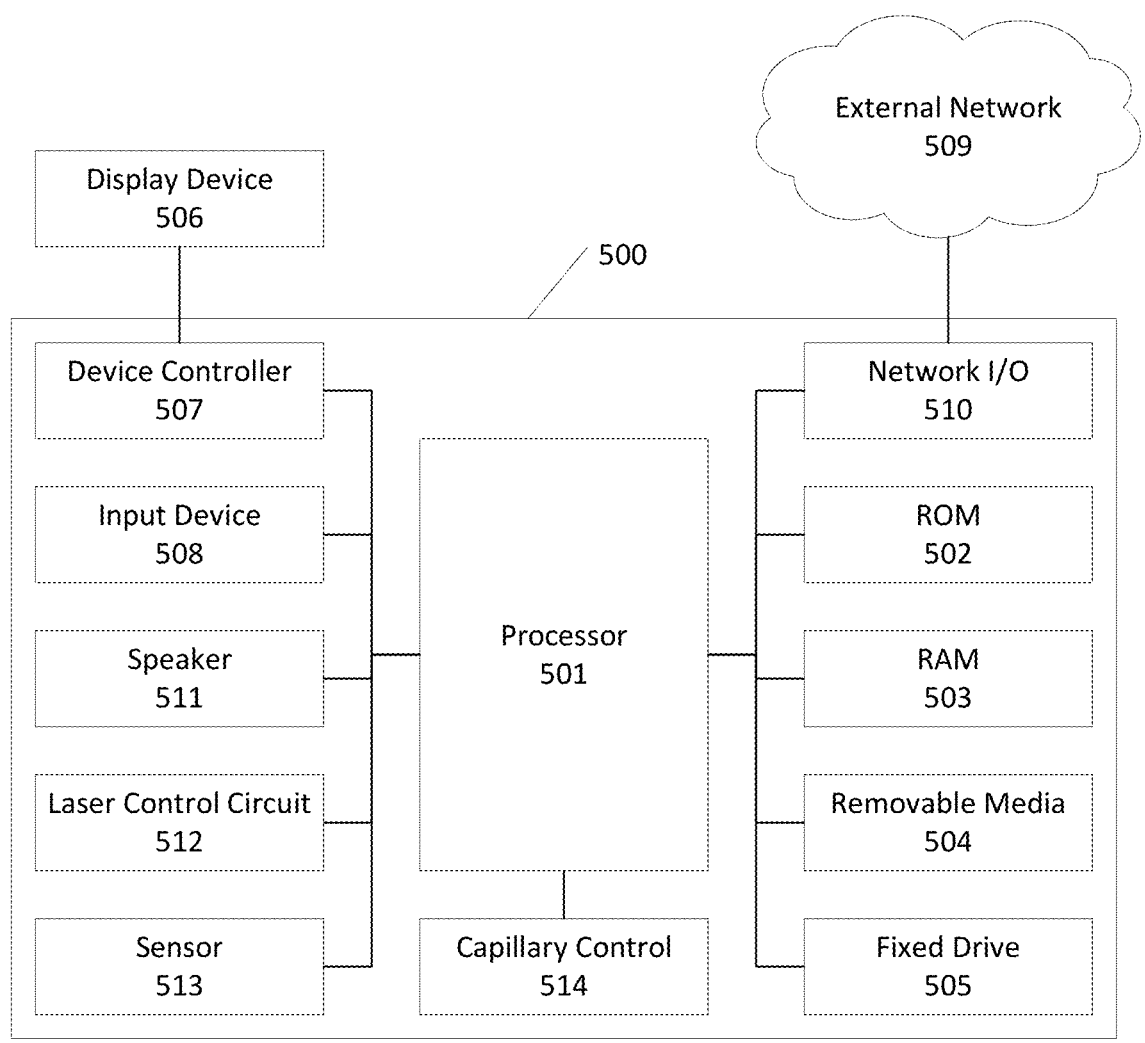
FIG. 5 shows an example of a computing device.

FIG. 5 shows hardware elements of a computing device 500 that may be used to conduct the experiments described herein. The computing device 500 may comprise one or more processors 501, which may execute instructions of a computer program to perform any of the functions described herein. The instructions may be stored in a read-only memory (ROM) 502, random access memory (RAM) 503, removable media 504 (e.g., a USB drive, a compact disk (CD), a digital versatile disk (DVD)), and/or in any other type of computer-readable medium or memory. Instructions may also be stored in an attached (or internal) fixed drive 505 or other types of storage media. The computing device 500 may comprise one or more output devices, such as a display device 506 (e.g., an external display screen and/or other external or internal display device) and a speaker 511, and may comprise one or more output device controllers 507, such as a video processor. One or more user input devices 508 may comprise a remote control, a keyboard, a mouse, a touch screen (which may be integrated with the display device 506), microphone, etc. The computing device 500 may also comprise one or more network interfaces, such as a network input/output (I/O) interface 510 (e.g., a network card) to communicate with an external network 509. The network I/O interface 510 may be a wired interface (e.g., electrical, RF (via coax), optical (via fiber)), a wireless interface, or a combination of the two. The network I/O interface 510 may comprise a modem configured to communicate via the external network 509. The computing device 500 may include a laser control circuit 512 that may cause the laser to output a beam with a specified laser power. The computing device 500 may include one or more sensors 513 including, but not limited to, detecting fluorescence of a substance in the channel when irradiated by the laser. The computing device 500 may include a capillary control circuit 514 that controls the operations of the capillaries of FIG. 1A and provides an electrical potential to the channel. The processor 501 may comprise a single processor or multiple processors where each of the multiple processors may perform fewer operations. For example, one processor may be resident in the housing containing the laser. Another processor may be resident in the microchip provided in the microfluidic chip tray of FIG. 1A and control the operation of the capillaries.

Although FIG. 5 shows an example hardware configuration, one or more of the elements of the computing device 500 may be implemented as software or a combination of hardware and software. Modifications may be made to add, remove, combine, divide, etc. components of the computing device 500. Additionally, the elements shown in FIG. 5 may be implemented using basic computing devices and components that have been configured to perform operations such as are described herein. For example, a memory of the computing device 500 may store computer-executable instructions that, when executed by the processor 501 and/or one or more other processors of the computing device 500, cause the computing device 500 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 6:
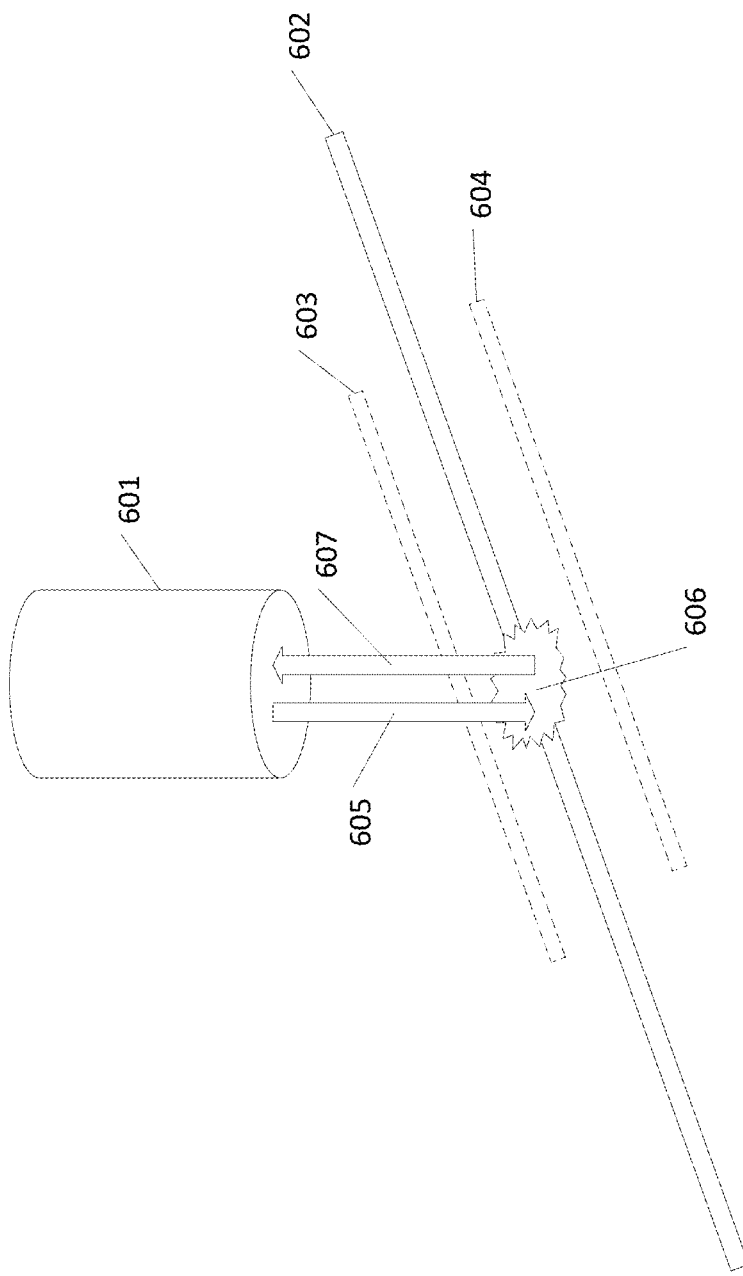
FIG. 6 shows an example of a laser illuminating a channel.

FIG. 6 shows an example of a laser illuminating a channel. A laser 601 generates a laser beam 605 and the beam is directed toward a channel 602. For simplicity, both the laser and a sensor detecting a fluorescence of material in the channel 602 are shown in the same housing as part of a single optical train. The sensor may be located with the laser or may be separate from the laser. For the purpose of illustration, the laser and sensor are shown together as element 601. Alignment marks 603 and 604 may optionally be provided on one or both sides of channel 602. The laser irradiates spot 606. As fluorescent material passes spot 606, the material fluoresces and the fluoresce 607 is sensed by the sensor. Alignment between the laser 601 and the channel 602 may affect the intensity of the fluorescence of the material in the channel. Similarly, the focusing of the laser on spot 606 may also affect the intensity of the fluorescence of the material. Once the microfluidic chip tray 100 is placed in the testing system, it may be difficult to reposition that microfluidic chip tray or the microchip on the microfluidic chip tray and then return the microfluidic chip tray to the testing system.

Systems, apparatuses, and methods are described that attempt to minimize variations due to various factors including focusing, alignment, and others by calibrating a laser to a control sample. FIGS. 7A and 7B show examples of laser powers for testing of more than one control sample in a multiwell plate (e.g., in column 1, rows A+). In FIG. 7A, a well (e.g., well 1A) is tested at four laser powers (e.g., 1-4) and then the next well (e.g., well 1B) is tested. In FIG. 7B, the wells are tested at a first laser power (e.g., power level 1) and then tested at a second laser power (e.g., power level 2). Additionally or alternatively, the laser powers and the order of the wells may be varied as desired.

Figure 8:
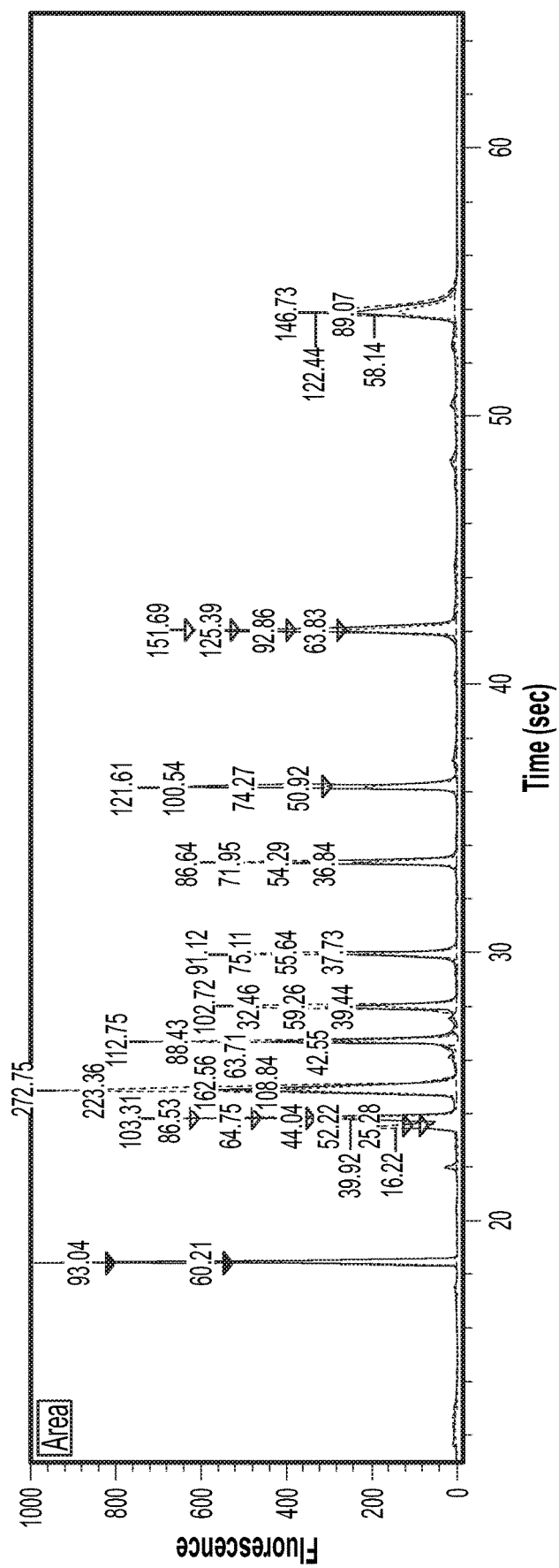
FIG. 8 shows an example of a graph with results of testing a sample at multiple laser powers.

FIG. 8 shows an example of a graph with results of testing a control sample at an identified concentration at multiple laser powers (e.g., with reference to FIG. 3, 303, 306). Time is shown on the horizontal axis and fluorescence is shown on the vertical axis. For example, for a given control sample, known peaks appear on a range of times. As the laser power is varied (303, 306), the intensity of the fluoresce changes for the same macromolecule (i.e., time) between runs at different laser powers. In the example of FIG. 8, nine different macromolecules are present in the control sample. Additionally or alternatively, a control sample of a single macromolecule may be used (for example, 120 kDa).

For example, for the peak at 42 seconds, four runs at different laser powers resulted in peak areas values of 63.83, 92.86, 125.39, and 151.69. If the empirically determined fluorescence for the known control analyte/protein has a peak area of 120, then the closest peak area from the runs at the four selected laser powers (FIG. 3, 303, 306) is the measurement of 125.39 (at 42 seconds). This determination may be made using the approaches described above or other approaches. For example, using the smallest difference approach, the difference in the measured peak areas (at 42 seconds) and the empirically determined peak area for the four selected laser powers is {−56.17, −27.14, 5.39, and 31.69}, respectively. The smallest difference is the third value, corresponding to the third selected laser power. The laser power associated with that third value may be selected as the calibrated laser power in step 308 of FIG. 3. Additionally or alternatively, an actual curve fitting approach may be used that would take the four measurements at 42 seconds and perform a curve fit, e.g., a linear regression, parabolic regression, etc., wherein the derived curve could be used to determine a calibrated laser power that would correspond to a peak area of 120. For example, using laser powers of 2, 4, 5, and 6, the processor may generate a curve that fits the measured sensor values relating to the laser powers and selecting a laser power where the difference between the curve and the empirically determined sensor value is zero (or at a minimum).

Figure 9:
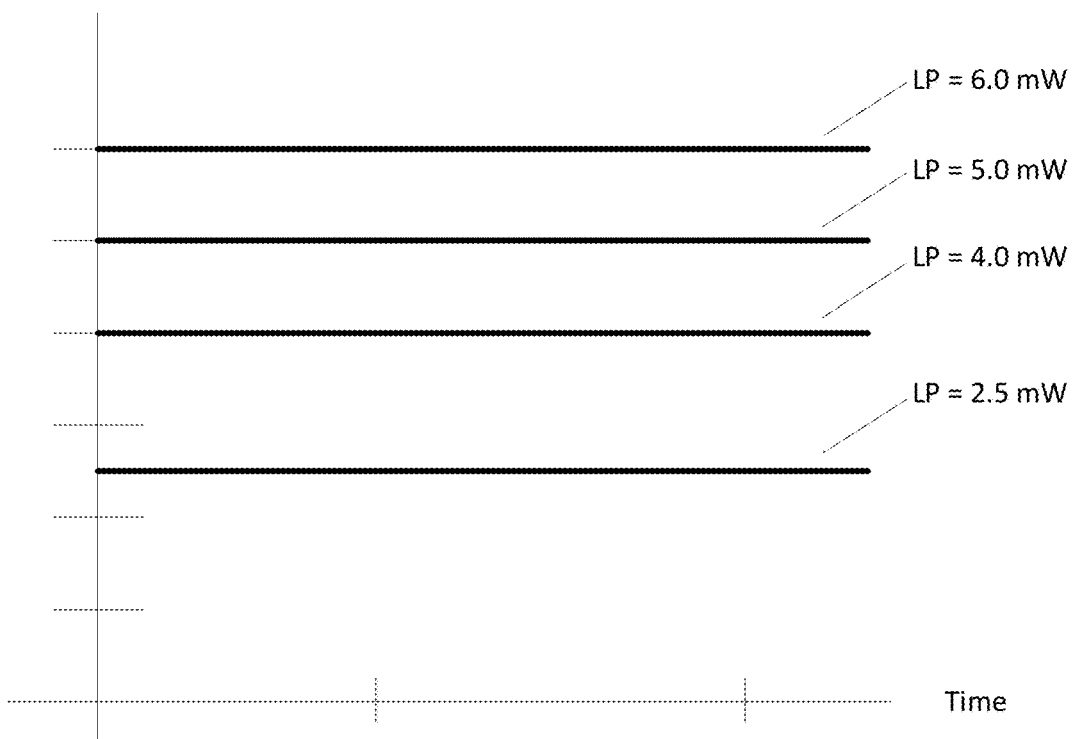
FIG. 9 shows an example of laser powers over time.
Figure 10:
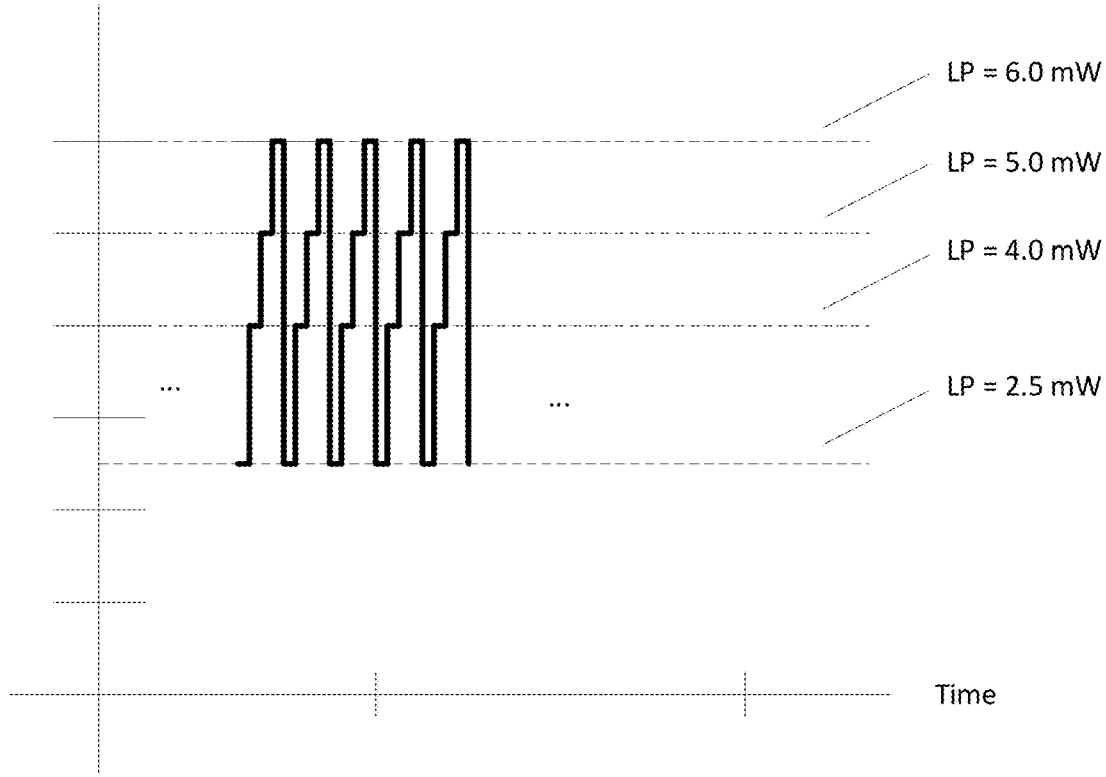
FIG. 10 shows another example of laser power over time.

FIG. 9 shows an example of laser powers over time. In the example of FIG. 10, four laser powers are shown and identified by laser power LP. The laser powers are shown as 2.5, 4.0, 5.0, and 6.0 mW. In embodiments, these laser powers may represent relative power levels and may be modified as desired. In FIG. 9, the laser powers are constant per run. A laser or lasers with adjustable laser intensity outputs may be used. Additionally or alternatively, fixed light intensity outputs may be used and the intensity of the light reaching the channel may be adjusted through optics including but not limited to lenses, mirrors, prisms, adjustable apertures, and the like. The identification of laser powers as {2.5, 4.0, 5.0, and 6.0} may be relative to an operational input or output power range of the laser or lasers. For example, a 15 mW laser may provide an adjustable power output. The identified laser powers (e.g., 2, 4, 8) may be the application of a range of numbers (e.g., 0-8) applied to the range of possible power outputs capable by the laser. Additionally or alternatively, the identified laser powers may represent a specific value (e.g., 2 mW, 4, mW, 8 mW). Additionally or alternatively, the identified laser powers may be determined relative to the linear detection range of a sensor or sensors (e.g., one or more photodiodes, CCDs, CMOS sensor arrays, and the like).

FIG. 10 shows another example of laser power versus time. In FIG. 10, the laser power for a given run is not fixed, but cycles through two or more of the laser powers. The laser is cycled through four power levels in FIG. 10. It is appreciated that the number of laser powers and/or levels cycled through may be modified. To comport with the cycling laser powers in FIG. 10, the sensor may be synchronized with the cycling rate or run faster than the cycling rate to minimize sensing two different power levels during a given exposure of the sensor. For example, if the laser is cycling at one cycle per millisecond, the sensor may be sensing values during a window lasting one millisecond or less.

Figure 11:
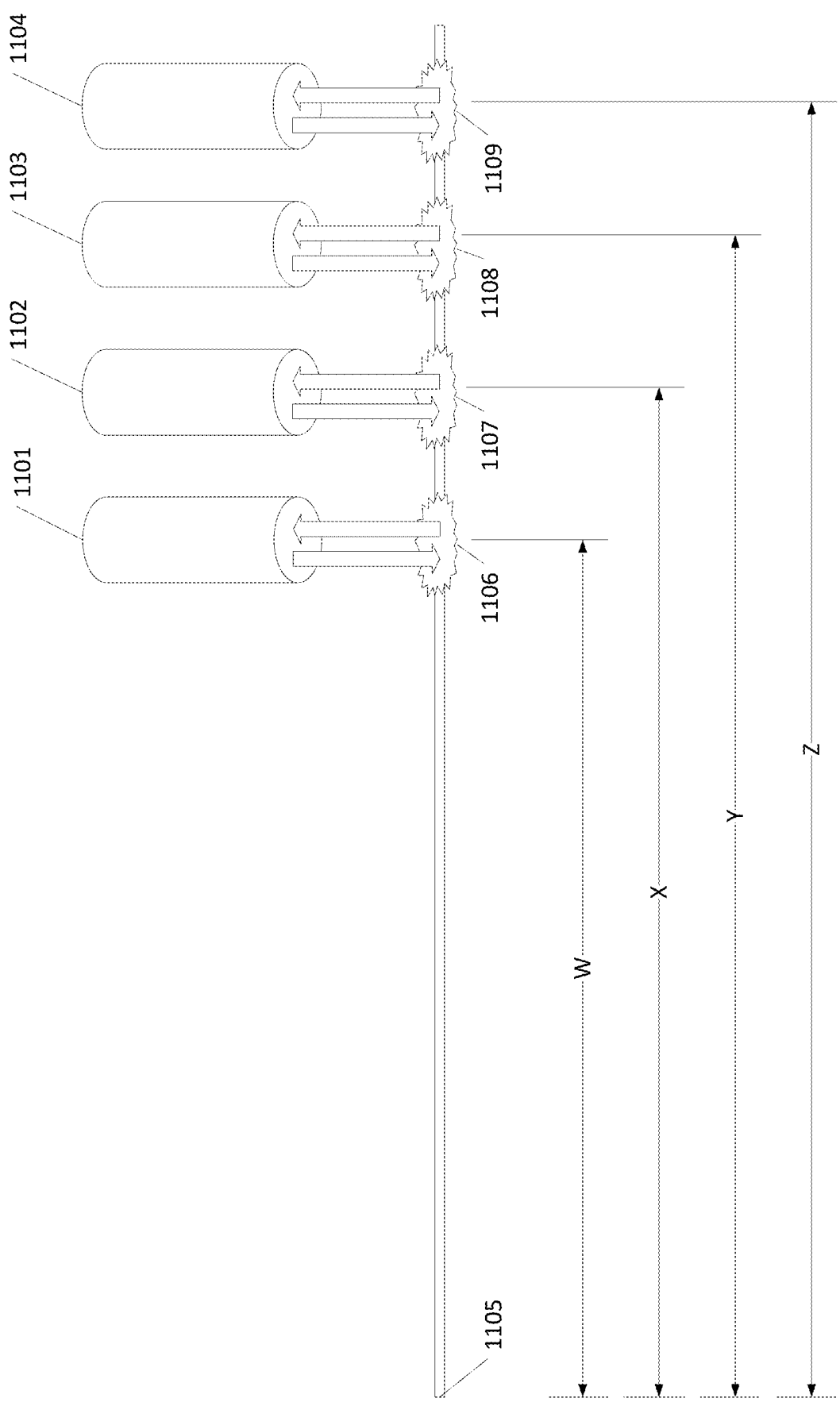
FIG. 11 shows an example of multiple lasers spaced along a channel.

FIG. 11 shows an example of multiple lasers spaced along a channel. Lasers 1101, 1102, 1103, and 1104 irradiate channel 1105 at spots 1106, 1107, 1108, and 1109, respectively. For reference, the spots 1106, 1107, 1108, and 1109 are shown spaced from a reference point in the channel by distances W, X, Y, and Z, respectively. The lasers 1101, 1102, 1103, and 1104 may provide the same wavelength of light but operate at different laser powers.

Additionally or alternatively, the lasers may provide light of different wavelengths and use constant or varying laser powers per run (as shown in FIGS. 9 and 10). Dyes that fluoresce at two or more frequencies of light may be used. Additionally or alternatively, multiple dyes that only fluoresce at one frequency may be used. Using lasers of different frequencies may reduce the total number of tests to be run. Each run may be performed with two or more lasers operating at different frequencies. Additionally or alternatively, each run may be performed with only one laser operating at a time.

Figure 12:
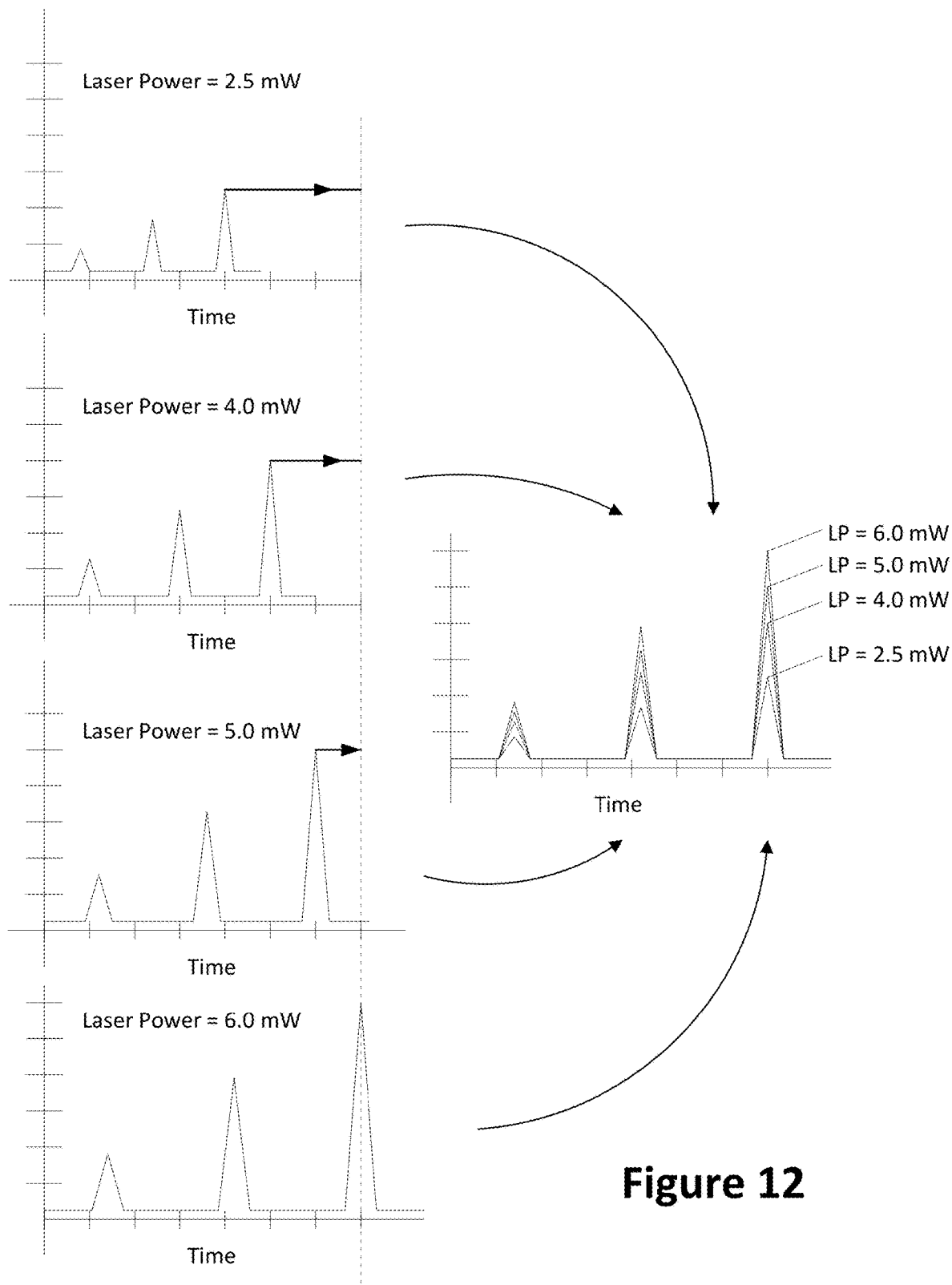
FIG. 12 shows examples of light intensity readings for a sample tested using four laser powers.

With reference to FIG. 11, based on the known (staggered) distances W, X, Y, and Z, the fluorescence values sensed by sensors may be correlated in time to provide a composite graph as shown in FIG. 8. FIG. 12 shows examples of light intensity readings for a sample tested using four laser powers where the irradiated spot from each laser was at a different location. FIG. 12 shows graphs of sensor readings for a control sample obtained at four laser powers (e.g., 2.5, 4.0, 5.0, and 6.0 mW). While the same control sample was used, the macromolecules arrive at different times based on the spacing of the irradiated spots. The sensor values (e.g., fluorescence) for each laser may not be initially correlated to each. FIG. 12 shows sensor readings relating to the four lasers being time correlated with each other and combined. For example, the time value for the sensors may be adjusted by a ratio to a desired time scale (shown by a vertical, dashed line) based on the differences between the locations of the spots. The desired time scale may coincide with one of the sensor readings' time scale (resulting in less than all sensor readings being adjusted) or none of the sensor readings' time scale (resulting in all sensor readings being adjusted).

The arrangement of FIG. 11 and correlation of FIG. 12 may reduce the number of times tests of a control sample are run to determine which laser power to use. If lasers 1101, 1102, 1103, and 1104 all output the same frequency of light, the laser using the selected laser power may be used for the runs of the sample to be tested. If lasers 1101, 1102, 1103, and 1104 output different frequencies of light, laser powers may be selected for each laser individually. For example, one or more of lasers 1101, 1102, 1103, or 1104 may provide light at a first wavelength (e.g., 488 nm) while another one or two of the lasers provides light at a second wavelength (e.g., 543 nm). Other light frequencies (e.g., 257 nm or 568) may be obtained by switching lasers.

The resulting set of sensor values from the arrangement of FIG. 11 may approximate the sensor readings shown in FIG. 8 (obtained using the arrangement of FIG. 6) but with a reduced total testing time. For example, to obtain the sensor readings of FIG. 8, at least four runs may have been performed. In contrast, to obtain the sensor readings using the arrangement of FIG. 11, one run may have been performed. Additionally or alternatively, multiple runs using the arrangement of FIG. 11 may provide more sensor data than that obtained per run using the arrangement of FIG. 6.

Figure 13:
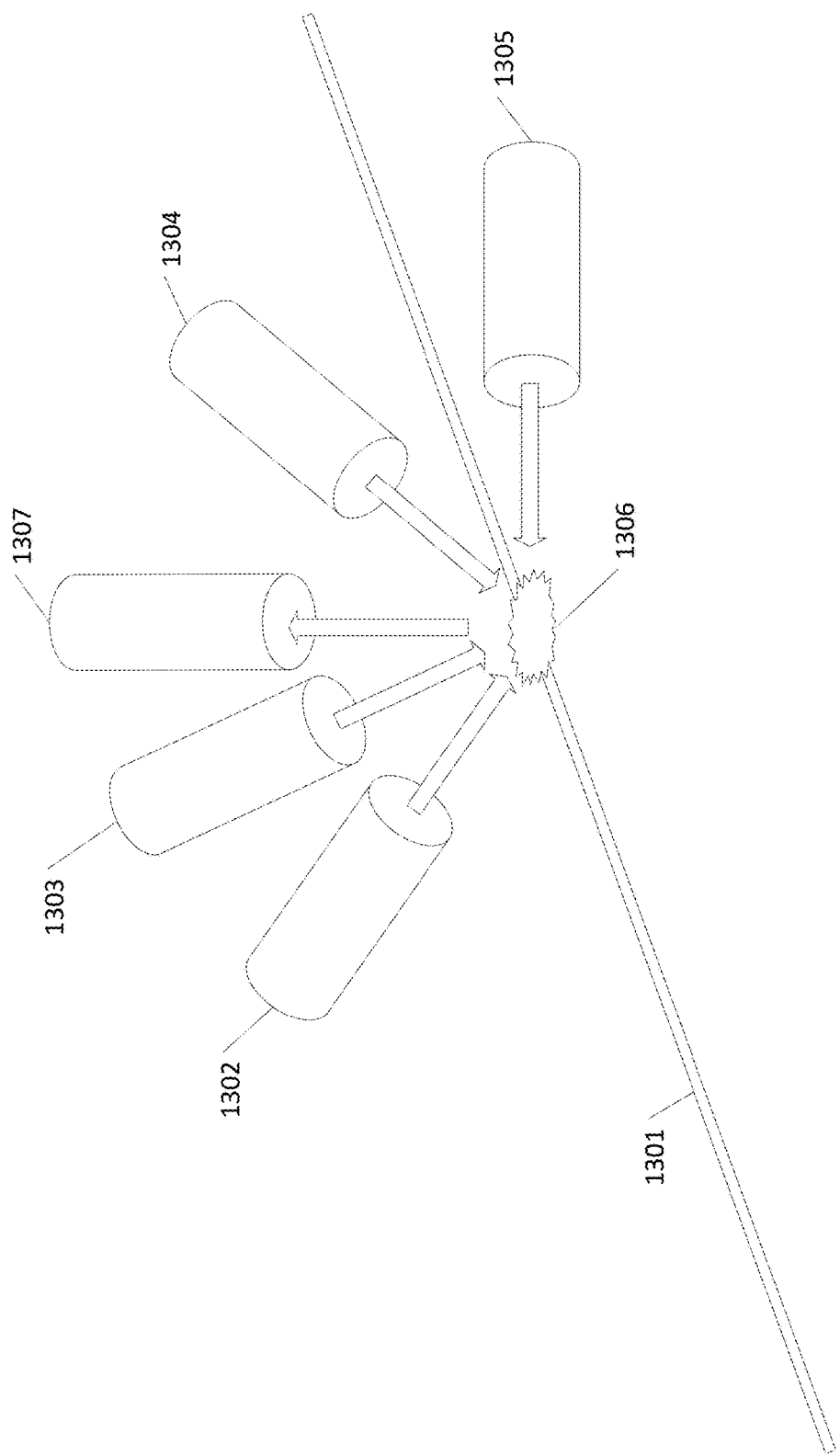
FIG. 13 shows an example of multiple lasers irradiating a common location along a channel.
Figure 14A:
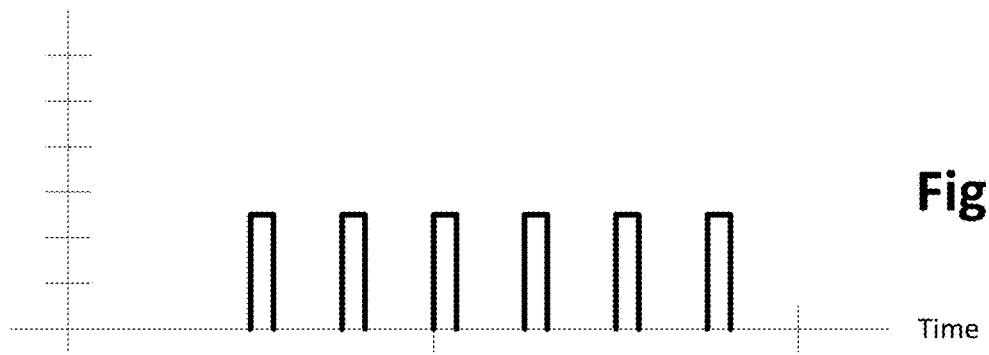
FIGS. 14A-14D show examples of laser powers spaced in time.
Figure 14B:
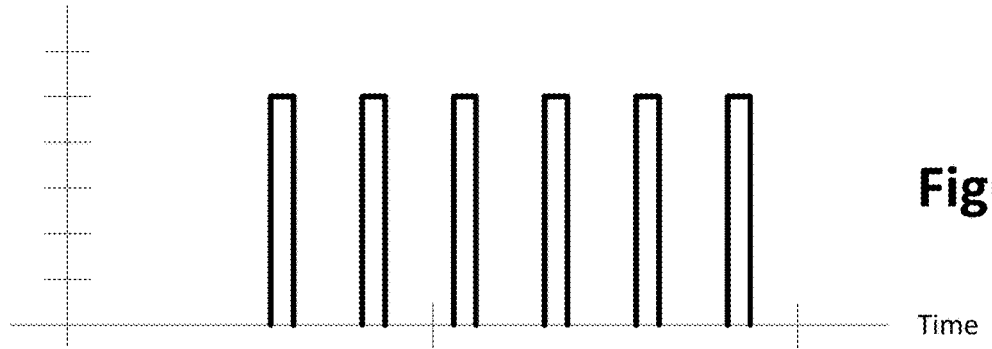
Figure 14C:
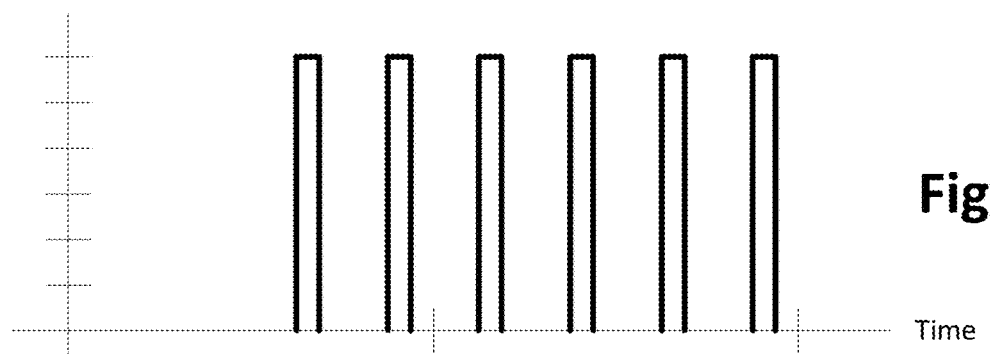
Figure 14D:
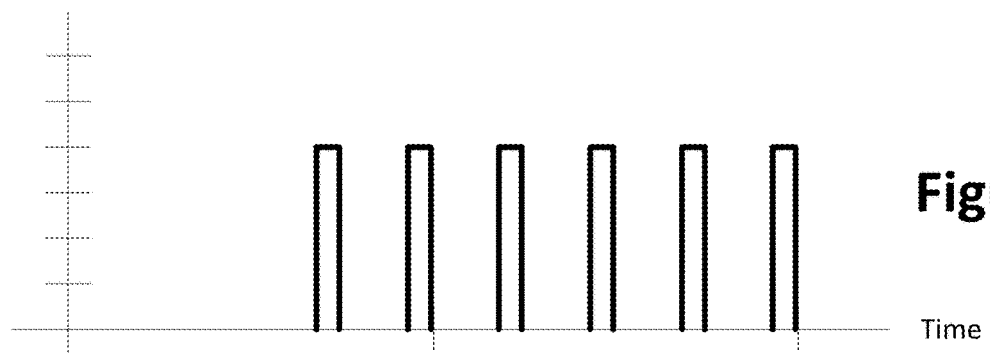

FIG. 13 shows an example of multiple lasers irradiating a common location along a channel. Macromolecules move along channel 1301 and are irradiated by lasers 1302-1305. One or more sensors may be used to measure the fluorescence of the macromolecules at spot 1306. The one or more sensors may be combined with lasers 1302-1305 (e.g., in the same housing as or close to each laser) or may be provided separately from the lasers 1302-1305 as sensor 1307.

FIGS. 14A-14D show examples of laser powers spaced in time that may be used with the lasers of FIG. 13. FIGS. 14A-14D show graphs of a laser outputs of different lasers at different laser powers where the outputs are spaced in time. Applied to the lasers of FIG. 13, the spot 1306 may receive light pulses, spaced in time, from the four lasers 1302-1305.

The resulting set of sensor values from the arrangement of FIG. 13 may approximate the sensor readings shown in FIG. 8 (obtained using the arrangement of FIG. 4) but with a reduced total testing time. For example, to obtain the sensor readings of FIG. 8, at least four runs may have been performed. In contrast, to obtain the sensor readings using the arrangement of FIG. 13, one run (e.g., using multiple tags or dyes, with corresponding detectors and proper filters to eliminate noise/crosstalk) may have been performed. Additionally or alternatively, multiple runs using the arrangement of FIG. 13 may provide more sensor data than that obtained per run using the arrangement of FIG. 6.

Figure 15:
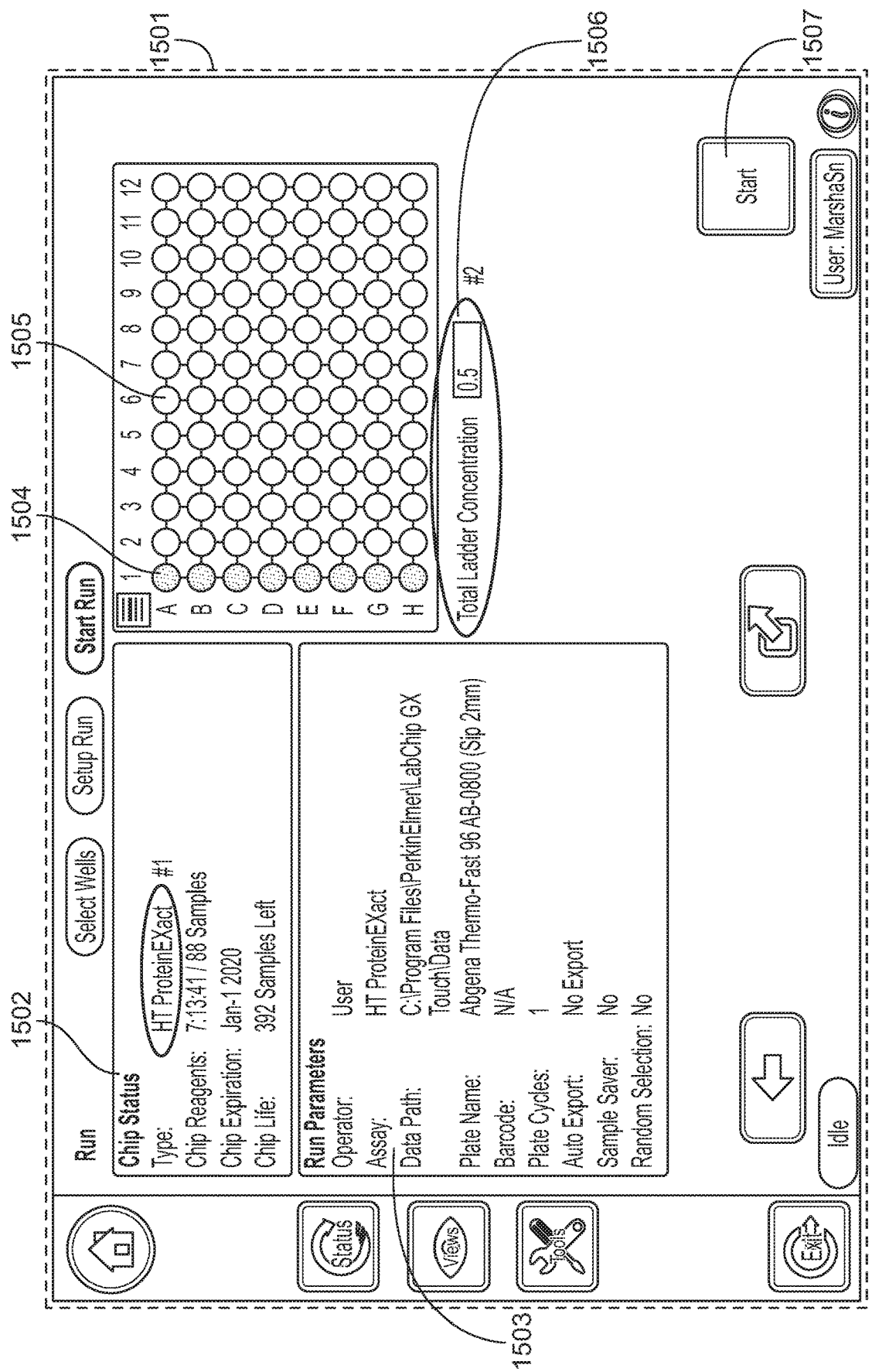
FIG. 15 shows a user interface permitting entry of a control sample's concentration.

FIG. 15 shows a user interface permitting entry of a known or control sample's concentration. FIG. 15 includes a user interface 1501 including chip status information 1502 and run parameters 1503. An image identifying a sample tray may be included with an identification 1504 of well locations of a control sample and an identification 1505 of well locations with a test sample. Optionally, well locations (not shown) may be identified that lack the control sample and lack the test sample. The user interface 1501 may include a location 1506 in which a technician enters a concentration for the control sample. The control sample may be located in only one well, multiple wells, or other combinations. The user interface 1501 may include a region 1507 relating to a start button. Upon selection of this region 1507, the system may begin the process of conducting one or more experiments on the control sample and/or the sample to be tested.

Figure 16:
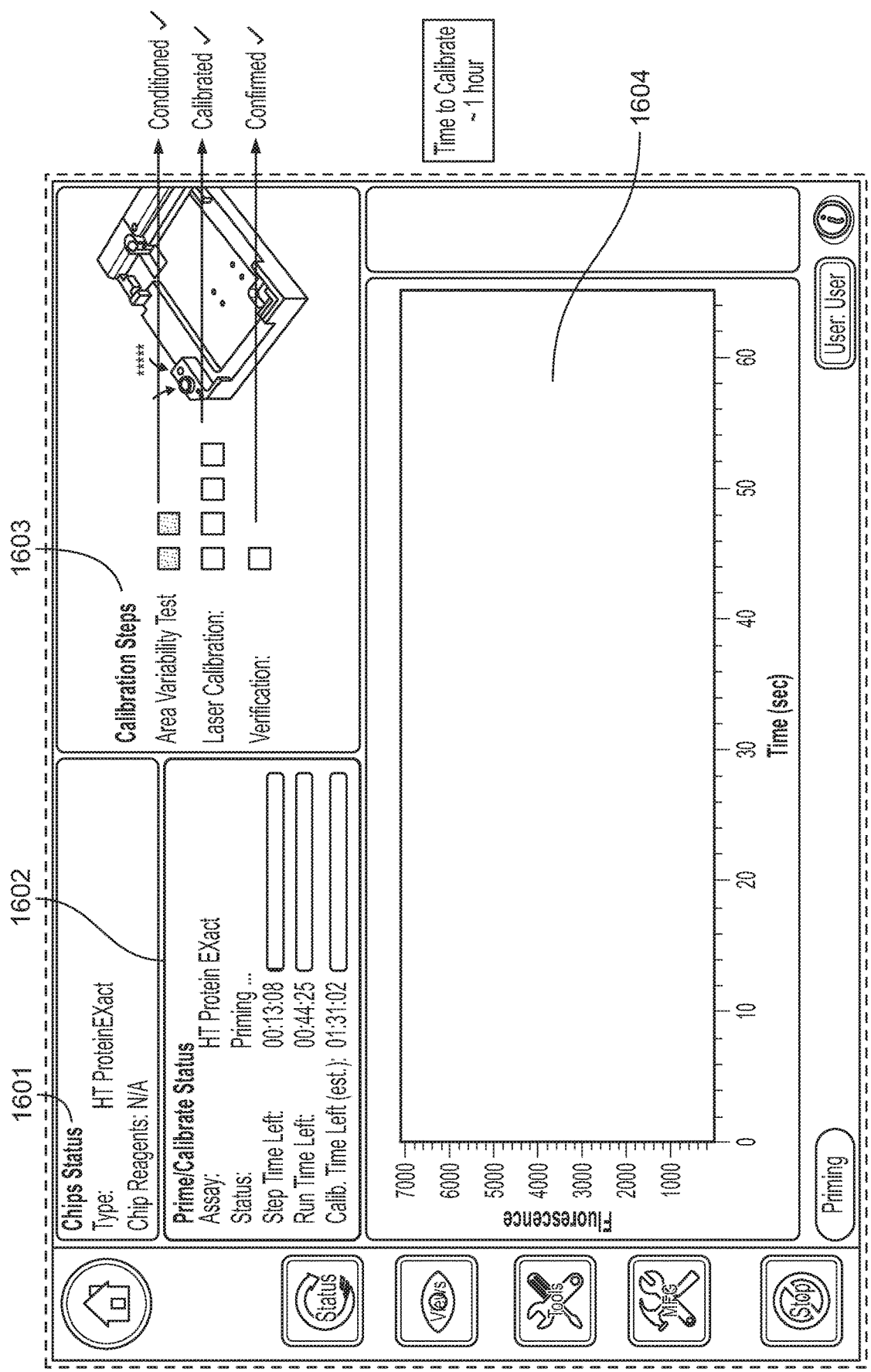
FIG. 16 shows a user interface showing system status.

FIG. 16 shows a user interface showing system status. The user interface 1601 may include a prime/calibration status region 1602 in which status information may be provided to a user. The status information may include one or more of an identification of the test being performed, the status of the system, step time elapsed and/or remaining, run time elapsed and/or remaining, and calibration time elapsed and/or remaining. The user interface 1601 may include a region 1603 in which additional calibration information may be displayed including status of the conditioning of the one or more trays, the laser(s) calibration(s), and optional verification. The user interface 1601 may include a fluoresce v. time display region 1604 in which information relating to the calibration operations may be provided.

Figure 17:
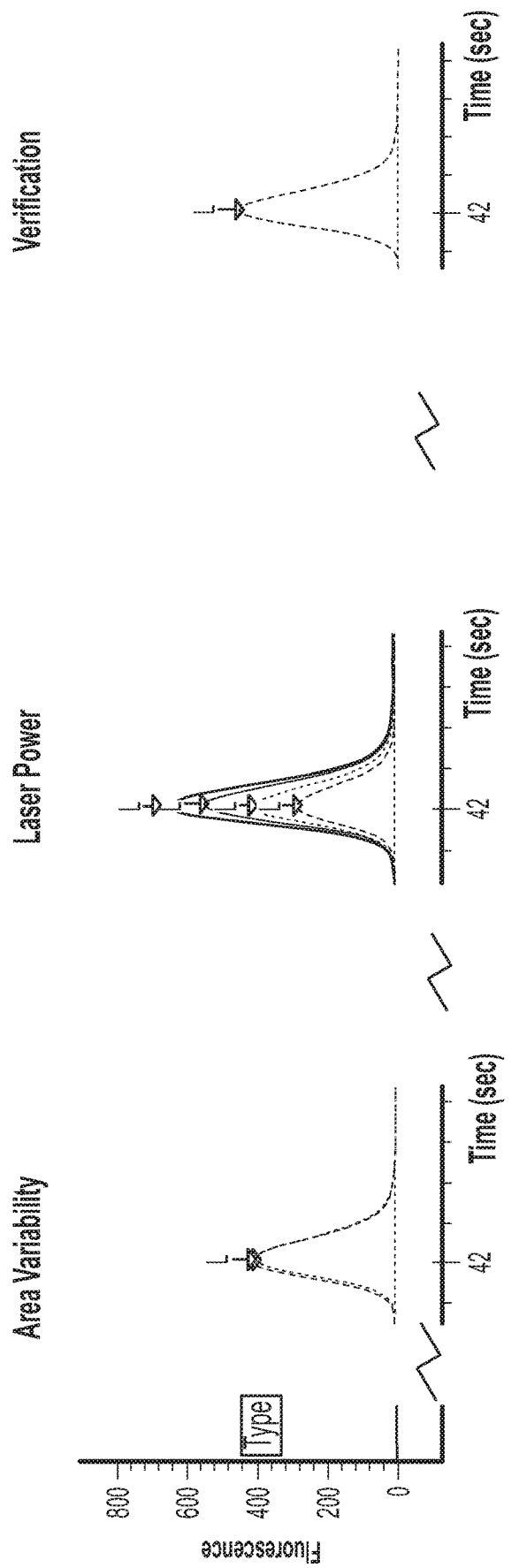
FIG. 17A shows an example of a reading showing area variability.
FIG. 17B shows an example of readings taken at various laser powers.
FIG. 17C shows another reading taken at a selected laser power.

The information that may be provided in region 1604 may include graphs of one or more of area variability over time (FIG. 17A), multiple fluoresce per laser power per time (FIG. 17B) and/or fluoresce over time (FIG. 17C) relating to a verification operation.

Figure 18:
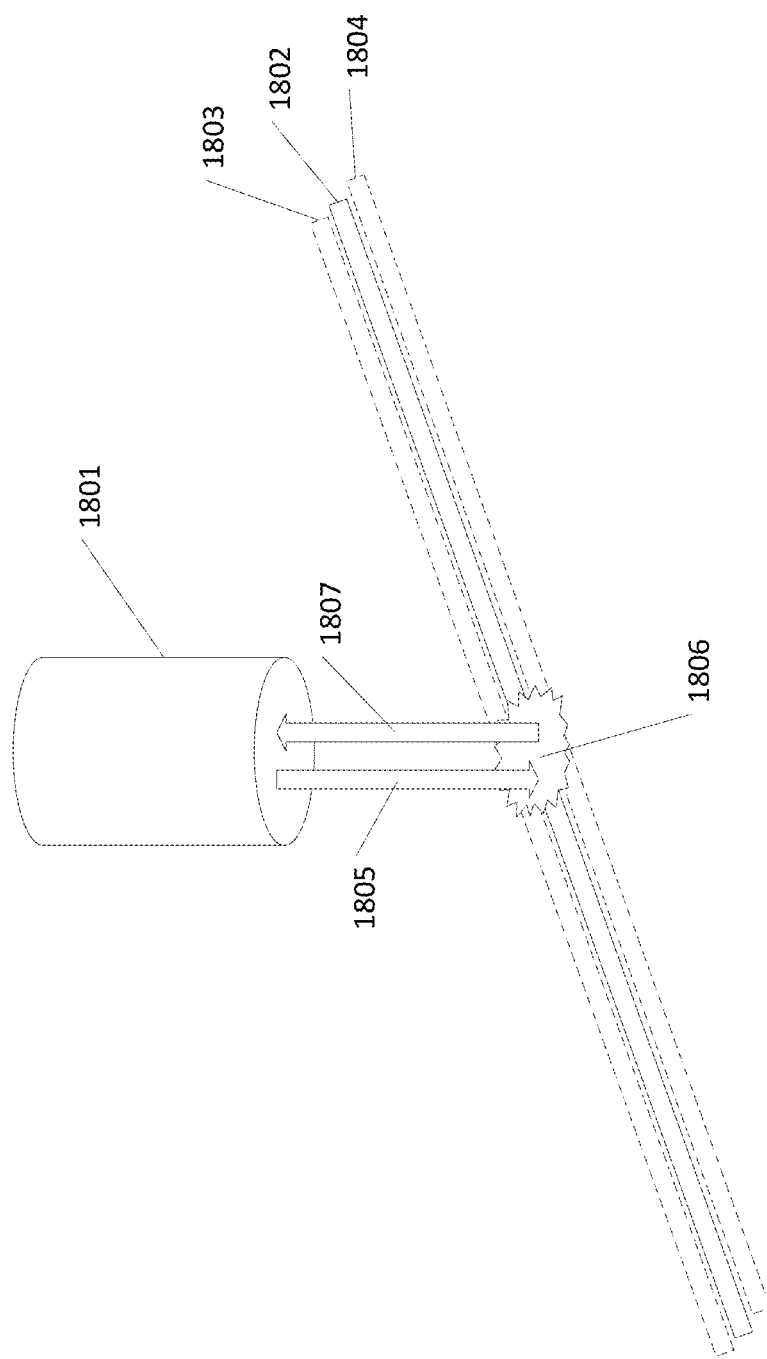
FIG. 18 shows variations in locations of laser irradiation per use of a microfluidic chip tray.

FIG. 18 shows variations in locations of laser irradiation per use of a tray. A laser/sensor 1801 is positioned relative to a channel 1802. Due to per-system alignment tolerances, technician variability, and other factors, a spot 1806 from laser beam 1805 may not be consistently aligned with the channel 1802 but may be slightly to one side or the other relative to the channel 1802 (resulting in a weaker return path 1807 fluorescence). This alignment variability is shown generally as possible channel locations 1803 and 1804 (in dashed lines) relative to the laser/sensor 1801. This variability may be at least partially addressed by calibrating the laser power relative to the concentration of a known control sample as described in the disclosed methods and systems.

Figure 19:
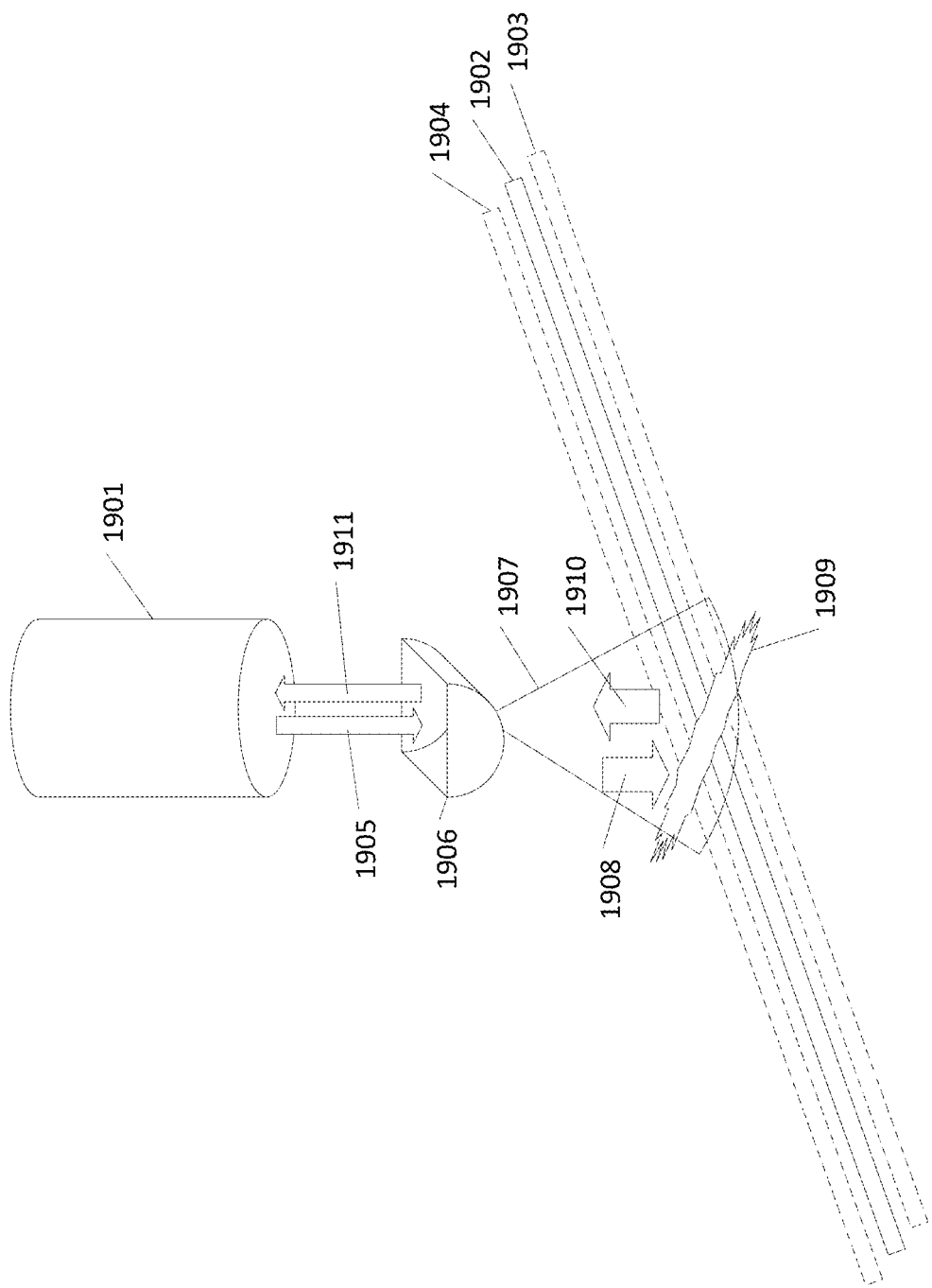
FIG. 19 shows an example of a laser with additional optics.

FIG. 19 shows an example of a laser with additional optics that may further reduce alignment variability between an irradiated spot and a channel. FIG. 19 shows a laser/sensor 1901 outputting a laser beam 1905, irradiating a spot 1909. The spot 1909 is aligned relative to a channel 1902. Alternative alignments of the channel 1902 are shown as channels 1903 and 1904 (in dashed lines). FIG. 19 includes additional optics that may include a cylindrical or other lens or combination of lenses 1906 that provide non-spherical distortion to beam 1905 resulting in a wider (across channels 1902-1904) but not appreciably longer (along channels 1902-1904) beam 1907. The illumination direction of the laser is shown by a wider arrow 1908 and the resulting fluoresce shown by return arrow 1910. In FIG. 19, resulting fluorescence is condensed by lens(es) 1906 to fluorescence 1911, and sensed by the sensor associated with laser/sensor 1901.

Figure 20:
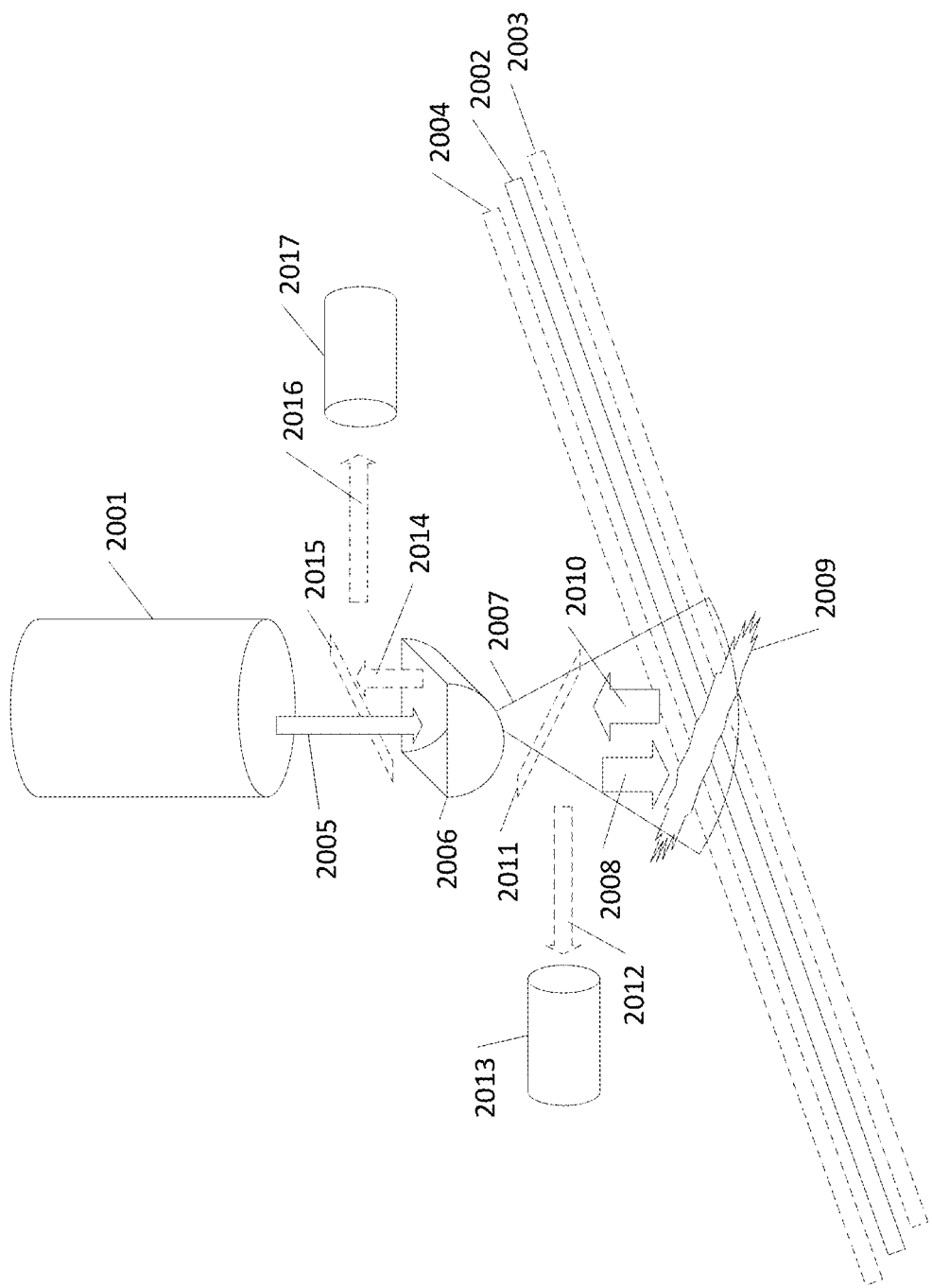
FIG. 20 shows another example of a laser with additional optics.

FIG. 20 shows another example of a laser with additional optics. FIG. 20 includes a laser 2001 and a channel 2002. The channel 2002 may be misaligned, shown as channels 2003 and 2004 in dashed lines. A non-spherical distorting lens(es) 2006 modifies laser beam 2005 into a wider but not necessarily longer beam 2007 in the direction of wider arrow 2008, irradiating spot 2009. A fluorescence signal is shown generally as arrow 2010. FIG. 20 may include one or more half-silvered mirrors or other partially reflective optical components 2011 and/or 2015. Component 2011 may reflect at least a portion of fluorescence signal 2010 (shown as arrow 2012) toward sensor 2013. Additionally or alternatively, component 2015 may direct at least a portion (shown as arrow 2016) of fluorescence 2014 (having passed through lens(es) 2006) toward sensor 2017. The use of component 2011 may reduce the effects of the distortion of lens(es) 2006 on the fluorescence signal 2010. The use of component 2015 may allow sensor 2017 to be electrically and/or thermally isolated from laser 2001.

It is appreciated that the other optical systems described herein may be modified to include one or more optical components including partially reflective components to direct or redirect a laser or fluorescence as desired. Additionally or alternatively, the optics may be moved relative to the channel to obtain a desired alignment and/or focus of the laser relative to the channel.

Figure 21:
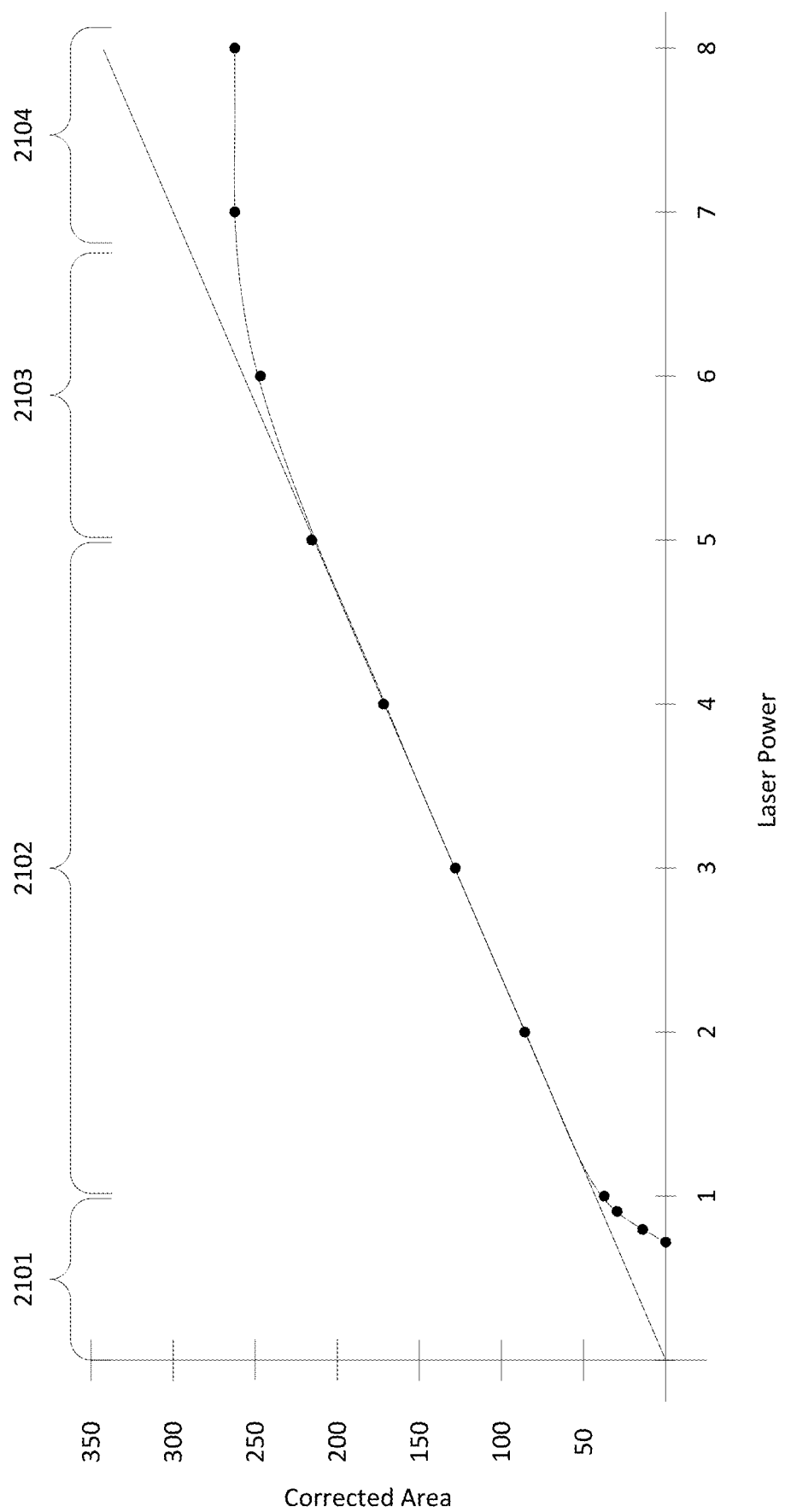
FIG. 21 shows a graph of examples of test runs graph of linear and non-linear regions of test runs at various laser powers.

FIG. 21 shows a graph of examples of test runs graph of linear and non-linear regions of test runs at various laser powers. An ideal sensor is shown as the line from the origin and being linear through the full range of laser power. At a low laser power range 2101, an actual sensor may not receive enough fluorescence signal to provide an accurate sensor reading. While the actual sensor may provide a linear response for laser powers in region 2102, the actual sensor may start exhibiting a non-linear response through region 2103 and eventually become saturated at laser powers in region 2104.

Figures 22, 23:
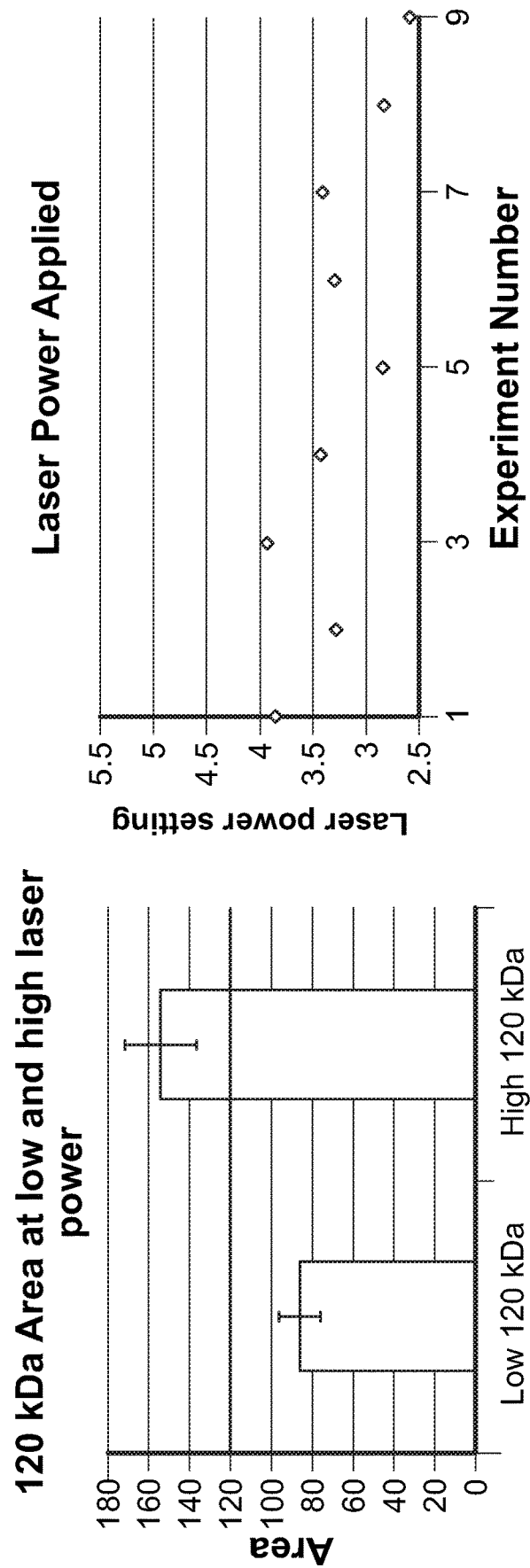
FIG. 22 shows a graph of example areas of 120 kDa at low and high laser powers.
FIG. 23 shows a graph of different laser powers that may be used per experiment.

FIG. 22 shows a graph of example areas of a 120 kDa macromolecule peak at low and high laser powers. The empirically determined peak area is shown as the horizontal line at 120 area. At the lower laser power, the area ranged between 80-95 with an average of approximately 82. At the higher laser power, the peak area ranged between 138-170 with an average of approximately 155. A power lever between the high and low laser powers may be selected such that the measured area is close to the empirically determined peak area (here, 120).

FIG. 23 shows an example of how laser powers may be modified between experiments. The laser powers may be calibrated for each experiment and the laser power resulting in the closest measured peak area to the empirically determined peak area for given concentration may be used.

Figure 24:
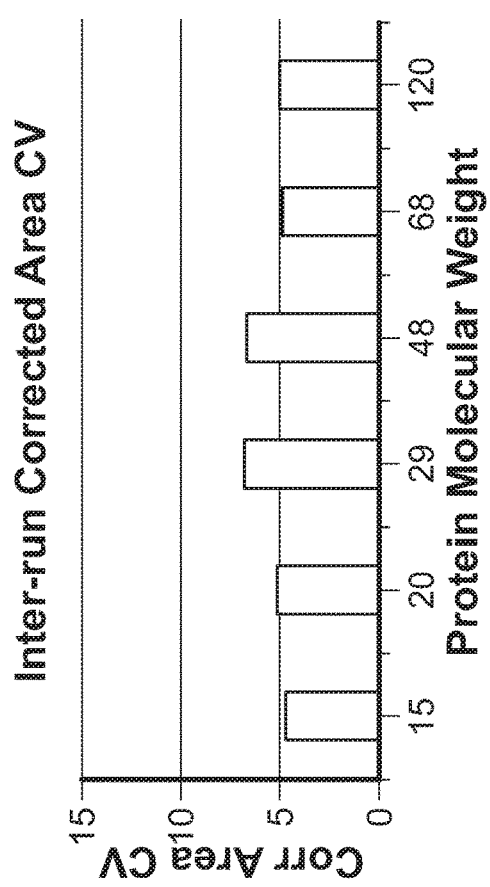
FIG. 24 shows an example of inter-run corrected area coefficients of variance for specific macromolecule molecular weights; and, FIG. 25 shows an example of concentration coefficients of variance for specific macromolecule molecular weights.

FIG. 24 shows an example of inter-run corrected area coefficients of variance for specific macromolecule molecular weights of 15, 20, 29, 48, 68, and 120 kDa. Inter-run CV for corrected area approached 5% across 12 runs.

Figure 25:
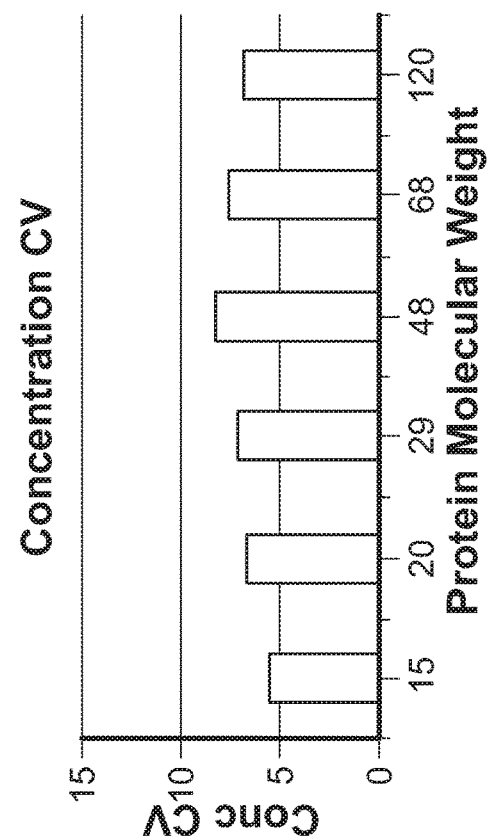

FIG. 25 shows an example of concentration coefficients of variance for specific macromolecule molecular weights of 15, 20, 29, 48, 68, and 120 kDa. Inter-run CV for concentration approached 5% across 12 runs.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A system comprising:
   a laser;
   a microfluidic channel;
   a sensor;
   a memory; and
   a processor configured to execute instructions stored in the memory, the instructions, when executed, cause the processor to:
   store a known concentration of a control analyte, the control analyte being present in a control sample at the known concentration;
   determine, using the known concentration of the control analyte and an empirically determined model, at least one empirically determined characteristic of the control analyte;
   perform multiple tests of the control sample at different laser powers applied to the microfluidic channel;
   obtain measurements from the sensor while performing the multiple tests;
   determine, based on the measurements from the sensor, at least one measured characteristic of the control analyte;
   compute a calibrated laser power based on a comparison between the at least one measured characteristic and the at least one empirically determined characteristic; and
   perform, at the calibrated laser power, at least one test of a sample.

2. The system according to claim 1, wherein the sensor measurements are intensities of light generated by at least one of fluorescent dyes or fluorescent tags associated with components of the control sample in the microfluidic channel.

3. The system according to claim 1, wherein at least one of the sensor measurements corresponds to a fluorescence related to the control analyte having the known concentration.

4. The system according to claim 1, wherein the instructions to determine the at least one empirically determined characteristic of the control analyte comprise instructions to determine at least one of a peak area, a peak height, or a peak width based on the known concentration of the control analyte.

5. The system according to claim 1, wherein the instructions, when executed, further cause the processor to store the sensor measurements.

6. The system according to claim 1, wherein:
   the instructions to determine the at least one empirically determined characteristic for the control analyte comprise instructions to determine an empirically determined peak area based on the known concentration of the control analyte and the empirical model;
   the instructions to determine the at least one measured characteristic of the control analyte from the sensor measurements include instructions to compute at least one measured peak area based on the sensor measurements of the control analyte; and
   the instructions to compute a calibrated laser power include instructions to compute the calibrated laser power based on a comparison between the empirically determined peak area and the at least one measured peak area.

7. The system according to claim 6, wherein the instructions to determine the empirically determined peak area include instructions to:
   express a peak area of the control analyte based on a linear relationship with the concentration of the control analyte, the linear relationship being expressed as:

$$y=mx+b,$$

where x is the known concentration of the control analyte, m is an empirically determined slope of the line, b is an empirically determined y-intercept of the line, and y is an empirically determined peak area.

8. The system according to claim 6,
wherein the instructions to compute the calibrated laser power based comparing the empirically determined peak area with the at least one measured peak area, include instructions to:
determine a quadratic polynomial expressed as $y=az^2+bz+c$ that represents a relationship between the different laser powers and the at least one measured peak area, wherein:
y is one of the at least one measured peak area of the control analyte,
z is one of the different laser powers used to perform the multiple tests, and
a, b, and c are fitting parameters that are adjusted to fit the polynomial to the at least one measured peak area; and
wherein the instructions to compute a calibrated laser power include instructions to compute, using the quadratic polynomial, a calibrated laser power that corresponds to the empirically determined peak area for the control analyte.

9. The system according to claim 8, wherein the instructions to determine a quadratic polynomial include instructions to determine the fitting parameters a, b, and c using at least one regression technique.

10. A method comprising:
providing an empirical model for a control analyte, the empirical model representing a relationship between a first characteristic of a control analyte and at least one second characteristic of the control analyte;
performing multiple tests of a control sample at different laser powers, wherein the control sample comprises the control analyte at a known concentration;
obtaining measurements from a sensor while performing the multiple tests;
computing, based on the measurements from the sensor, at least one measured characteristic of the control analyte;
determining, based on the known concentration of the control analyte and the empirical model, at least one empirically determined characteristic of the control analyte;
comparing the at least one measured characteristic of the control analyte with the at least one empirically determined characteristic of the control analyte;
providing a computed laser power based on a comparison between the at least one measured characteristic and the at least one empirically determined characteristic; and
performing, at the computed laser power, multiple tests of a sample.

11. The method according to claim 10, wherein the measurements from the sensor are intensities of light corresponding to fluorescence of the control sample.

12. The method according to claim 10, wherein the first characteristic is a concentration of the control analyte and the at least one second characteristic comprises a peak area corresponding to the control analyte in an electrophoretic separation.

13. The method according to claim 12, wherein:
the empirical model is a linear model;
the linear model is based on tests of the control analyte that independently vary individual test parameters; and
the individual test parameters comprise at least one of concentration of the control analyte or laser power.

14. The method according to claim 10, wherein comparing the at least one measured characteristic with the empirically determined at least one characteristic, comprises:
processing the measurements from the sensor in accordance with the at least one empirical characteristic of the control analyte that is associated with the empirical model.

15. The method according to claim 10, wherein the at least one measured characteristic of the control analyte comprises: at least one of a peak area, a peak height, or peak width.

16. The method according to claim 10, wherein:
the empirical model for the control analyte expresses a linear relationship between an empirically determined peak area of the control analyte, y, and the known concentration of the control analyte, x, as $y=mx+b$, wherein m is a slope of a line, b is a y-intercept of the line, and m and b are based on empirical data;
determining the at least one empirically determined characteristic of the control analyte comprises determining, using the linear relationship, the empirically determined peak area, y, based on the known concentration of the control analyte in the control sample, and
comparing the at least one measured characteristic of the control analyte with the at least one empirically determined characteristic comprises:
(i) determining a quadratic polynomial expressed as $y=az^2+bz+c$ that represents a relationship between the different laser powers and at least one measured peak area associated with the measurements from the sensor, wherein:
y is one of the at least one measured peak area of the control analyte,
z is one of the different laser powers used to perform the multiple tests, and
a, b, and c are fitting parameters that are adjusted to fit the polynomial to the at least one measured peak area; and
(ii) computing, using the quadratic polynomial, a calibrated laser power that corresponds to the empirically determined peak area for the control analyte.

17. The method according to claim 10, wherein providing the empirical model comprises collecting empirical data using a known test system while varying test parameters associated with the first characteristic and the at least one second characteristic of the control analyte.

18. The method according to claim 10, wherein providing the empirical model comprises determining a relationship between a concentration of the control analyte and a peak area corresponding to an electrophoretic separation of the control analyte.

19. The method according to claim 10, wherein providing the empirical model comprises determining a linear relationship between a concentration of the control analyte and a peak area corresponding to an electrophoretic separation of the control analyte.

* * * * *